(12) United States Patent
Wijetunge et al.

(10) Patent No.: US 9,642,155 B2
(45) Date of Patent: May 2, 2017

(54) METHOD AND APPARATUS FOR DYNAMIC INTER-CELL INTERFERENCE AVOIDANCE IN CELLULAR COMMUNICATION NETWORKS

(71) Applicant: CELLOS SOFTWARE LTD, Melbourne (AU)

(72) Inventors: Sumudu Prasad Wijetunge, Berwick (AU); Kumbesan Sandrasegaran, Baulkham Hills (AU)

(73) Assignee: CELLOS SOFTWARE LTD, Melbourne (AU)

( * ) Notice: Subject to any disclaimer, the term of this patent is extended or adjusted under 35 U.S.C. 154(b) by 50 days.

(21) Appl. No.: 14/729,780

(22) Filed: Jun. 3, 2015

(65) Prior Publication Data
US 2015/0351106 A1 Dec. 3, 2015

Related U.S. Application Data

(60) Provisional application No. 62/007,192, filed on Jun. 3, 2014.

(51) Int. Cl.
*H04W 4/00* (2009.01)
*H04W 72/12* (2009.01)
*H04W 72/04* (2009.01)

(52) U.S. Cl.
CPC .... *H04W 72/1226* (2013.01); *H04W 72/0493* (2013.01); *H04W 72/1247* (2013.01)

(58) Field of Classification Search
CPC ............. H04W 72/12; H04W 72/1226; H04W 72/1231; H04W 72/1236; H04W 72/1242; H04W 72/1247; H04W 72/1252; H04W 72/0493
See application file for complete search history.

(56) References Cited

U.S. PATENT DOCUMENTS

| | | | | |
|---|---|---|---|---|
| 8,559,364 B2* | 10/2013 | Hwang | ............... | H04W 72/046 370/310 |
| 2009/0124261 A1* | 5/2009 | Shimomura | ........ | H04W 72/082 455/436 |
| 2009/0196193 A1* | 8/2009 | Frenger | ............. | H04W 72/1242 370/252 |
| 2009/0219876 A1* | 9/2009 | Kimura | ............ | H04W 72/1247 370/329 |
| 2009/0239524 A1* | 9/2009 | Terabe | ............. | H04W 72/0413 455/423 |
| 2009/0245172 A1* | 10/2009 | Sato | .................. | H04W 72/1231 370/328 |
| 2010/0182972 A1* | 7/2010 | Katayama | ........... | H04W 72/048 370/329 |
| 2010/0214997 A1* | 8/2010 | Tao | ........................ | H04W 16/12 370/329 |
| 2010/0267408 A1* | 10/2010 | Lee | ..................... | H04W 52/243 455/509 |
| 2011/0081865 A1 | 4/2011 | Xiao et al. | | |
| 2011/0222416 A1* | 9/2011 | Damnjanovic | ....... | H04W 72/12 370/252 |

(Continued)

*Primary Examiner* — Kevin Mew
(74) *Attorney, Agent, or Firm* — Shumaker, Loop & Kendrick, LLP

(57) ABSTRACT

The present disclosure relates to resource allocation optimization for dynamic inter-cell interference avoidance in cellular communication networks, such as Cloud Radio Access Networks (C-RANs).

17 Claims, 18 Drawing Sheets

(56) References Cited

U.S. PATENT DOCUMENTS

| | | | |
|---|---|---|---|
| 2011/0317742 A1* | 12/2011 | Kawahatsu | H04L 1/0003 375/132 |
| 2012/0008489 A1* | 1/2012 | Higuchi | H04L 5/0007 370/203 |
| 2012/0028664 A1 | 2/2012 | Zhang et al. | |
| 2012/0244871 A1 | 9/2012 | Zhao | |
| 2012/0281569 A1* | 11/2012 | Yamamoto | H04L 1/1893 370/252 |
| 2012/0307750 A1* | 12/2012 | Hunukumbure | H04W 16/10 370/329 |
| 2013/0163500 A1* | 6/2013 | Na | H04W 72/005 370/312 |
| 2014/0023050 A1* | 1/2014 | Seo | H04W 72/0486 370/336 |
| 2014/0073342 A1* | 3/2014 | Lioulis | H04W 64/00 455/452.2 |
| 2014/0106761 A1* | 4/2014 | Lee | H04W 28/16 455/450 |
| 2014/0106766 A1* | 4/2014 | Burchardt | H04W 52/241 455/452.1 |
| 2014/0213269 A1* | 7/2014 | Nama | H04W 28/16 455/451 |
| 2014/0219267 A1* | 8/2014 | Eyuboglu | H04W 56/001 370/350 |
| 2014/0256331 A1* | 9/2014 | Adachi | H04J 11/003 455/447 |
| 2014/0273862 A1* | 9/2014 | Maaref | H04W 72/1278 455/63.1 |
| 2014/0286256 A1* | 9/2014 | Chowdhury | H04L 47/56 370/329 |
| 2015/0131537 A1* | 5/2015 | Chiang | H04L 5/0057 370/329 |

\* cited by examiner

METHOD AND APPARATUS FOR DYNAMIC INTER-CELL INTERFERENCE AVOIDANCE IN CELLULAR COMMUNICATION NETWORKS

CROSS-REFERENCE TO RELATED APPLICATIONS

This application claims priority to U.S. Provisional Application No. 62/007,192 filed Jun. 3, 2014 and titled METHOD FOR ALLOCATING RESOURCE IN CLUSTER BY USING DYNAMIC INTER-CELL INTERFERENCE AVOIDANCE AND RADIO RESOURCE RESTRICTION AND COMMUNICATION APPARATUS USING THE SAME, the disclosure of which is incorporated herein by reference in its entirety.

FIELD

The present disclosure relates to resource allocation optimisation for dynamic inter-cell interference avoidance in cellular communication networks, such as Cloud Radio Access Networks (C-RANs).

BACKGROUND

Cloud-based architectures, such as C-RAN, have been proposed to increase performance of cellular communication networks in dense areas with high traffic demands. C-RANs offer performance gains with low capital expenditure and operational expenditure by deploying centralised processing servers connected to densely deployed base stations. Unfortunately, high densities of base stations incur severe inter-cell interference which restricts performance gains and commercial deployments of C-RANs.

In this context, there is a need for solutions to inhibit inter-cell interference (ICI) in cloud-based cellular network architectures.

SUMMARY

According to the present disclosure there is provided a method, comprising: classifying users in each of adjacent cells in a cellular communication network into cell edge users and cell centre users; determining allocation priorities for each of the adjacent cells; allocating resources to the users in each of the adjacent cells based on the allocation priorities, except that resources allocated to cell edge users in one of the adjacent cells are restricted from use by other adjacent cells having lower allocation priorities to thereby inhibit inter-cell interference among the adjacent cells.

The method may be performed iteratively, wherein the determining allocation priorities for each of the adjacent cells is changed at each iteration.

The use by the other adjacent cells may be use by cell edge users in the other adjacent cells.

The determining allocation priorities may be based on one of a random selection among the adjacent cells, a round-robin selection among the adjacent cells, and a fairness algorithm to determine a fair allocation among the adjacent cells.

The classifying users may be based on reference signal strengths of each of the users.

The allocating resources may be based on a packet scheduling algorithm.

The method may be performed by a base station server coupled to base station clients at each of the adjacent cells.

The users may each comprise a user equipment, and the adjacent cells may form a cell cluster.

The cellular communication network may comprise a cloud radio access network.

The present disclosure also provides an apparatus, comprising: a processor, a memory coupled to the processor; and instructions stored in the memory that, when executed by the processor, cause the processor to: classify users in each of adjacent cells in a cellular communication network into cell edge users and cell centre users; determine allocation priorities for each of the adjacent cells; allocate resources to the users in each of the adjacent cells based on the allocation priorities, except that resources allocated to cell edge users in one of the adjacent cells are restricted from use by other adjacent cells having lower allocation priorities to thereby inhibit inter-cell interference among the adjacent cells.

The cellular communication network may comprise a cloud radio access network comprising a base station server coupled to base station clients at each of the adjacent cells.

The apparatus may be the base station server.

The present invention also provides an apparatus, comprising: a classifier module configured to classify users in each of adjacent cells in a cellular communication network into cell edge users and cell centre users; a priority module configured to determine allocation priorities for each of the adjacent cells; and an allocation module configured to allocate resources to the users in each of the adjacent cells based on the allocation priorities, except that resources allocated to cell edge users in one of the adjacent cells are restricted from use by other adjacent cells having lower allocation priorities to thereby inhibit inter-cell interference among the adjacent cells.

BRIEF DESCRIPTION OF DRAWINGS

Embodiments of the disclosure will now be described by way of example only with reference to the accompanying drawings, in which:

FIG. 4 is a schematic diagram of the physical components of base station clients 11a, 12a and 13a;

DETAILED DESCRIPTIONS OF EXEMPLARY EMBODIMENTS

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps. Thus, in the context of this specification, the term "comprising" means "including principally, but not necessarily solely". As used herein, the term "configured" means that the element, component, module, unit or other subject matter is designed, constructed, and/or intended to perform a given function. Thus, the use of the term "configured" should not be construed to mean that a given element, component, or other subject matter is simply "capable" of performing a given function but that the element, component, and/or other subject matter is specifically selected, created, implemented, utilised, programmed, designed, and/or constructed for the purpose of performing the function. Further, the function of components or modules of the apparatus and systems described herein may be implemented in hardware, software, circuitry and combinations thereof. As used herein, the term "inhibit" means to cause a decrease in a specified characteristic, or to suppress, avoid, or cancel the specified characteristic either at least partially or entirely.

In the present disclosure, the Long Term Evolution (LTE) communication system refers to a wireless communication system supporting Third Generation Project Partnership (3GPP) Technical Specifications Release 8, 9. The LTE-Advanced communication system refers to a wireless communication system supporting 3GPP Technical Specifications Release 10 and future releases.

Figure 1:
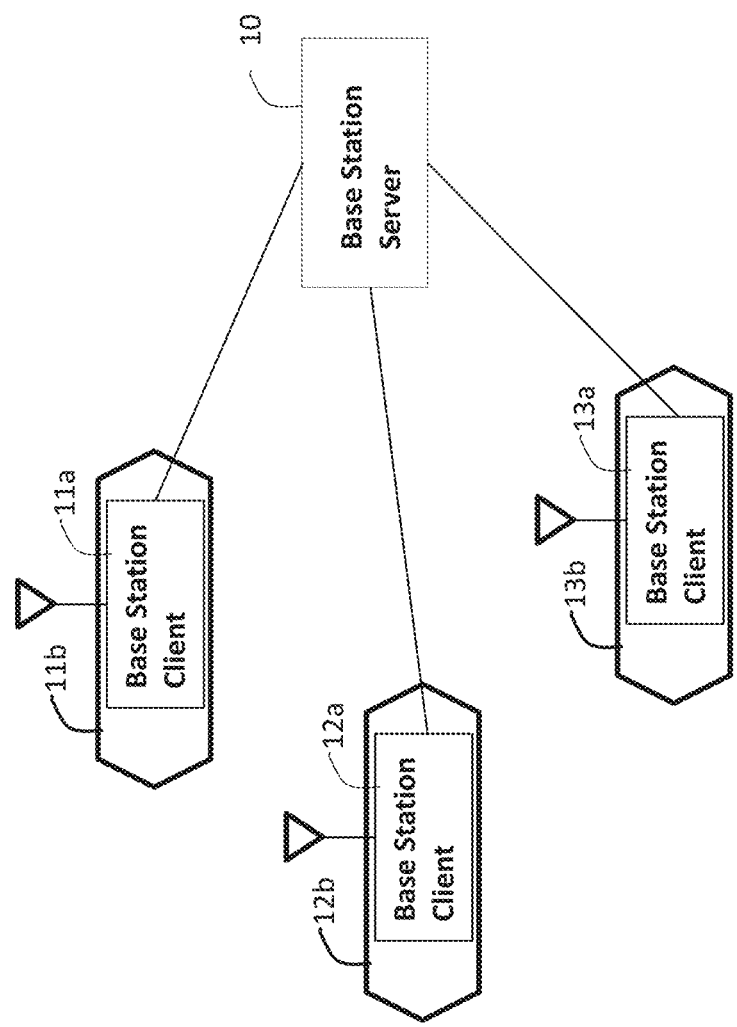
FIG. 1 is a schematic diagram of an embodiment of a wireless communication system.

FIG. 1 is a schematic diagram of an embodiment of the system 1. The system 1 conforms to the 3GPP LTE standard and is based on a C-RAN arrangement where baseband processing that is typically performed by a conventional base station (eNodeB) is split/distributed between a base station server 10 (which may also be referred to as a base station hotel) and base station clients 11a, 12a and 13a (which may also be referred to as a cell site equipment or a Remote Radio Head Unit (RHU)).

In the system 1 of FIG. 1, there is one base station server 10 and three base station clients 11a, 12a and 13a. Persons skilled in the art will appreciate that the system 1 may include one, two, three or more base station clients 11a, 12a and 13a.

Each base station client 11a, 12a and 13a is located at a respective one of a plurality of cell sites (or antenna towers) 11b, 12b and 13b remote from the location of the base station server 10, and are connected to the base station server 10 via an optical fibre link. Persons skilled in the art will appreciate that one or more of the base station clients 11a, 12a and 13a may alternatively be connected to the base station server 10 via a different type of link, such as for example, a high-speed wireless link.

The base station server 10 may be connected to other base station servers or conventional eNodeBs via a connection point (such as for example, a General Packet Radio Service (GPRS) Tunnelling Protocol-User plane (GTP-U) Tunnel end point) at a core network (such as an Evolved Packet Core (EPC)). The system 1 may support multiple bands and be scaled by increasing the number of base station clients beyond three as well as the capacity of the base station server 10, for example, by increasing the number of baseband processing units in the base station server 10.

Figure 2:
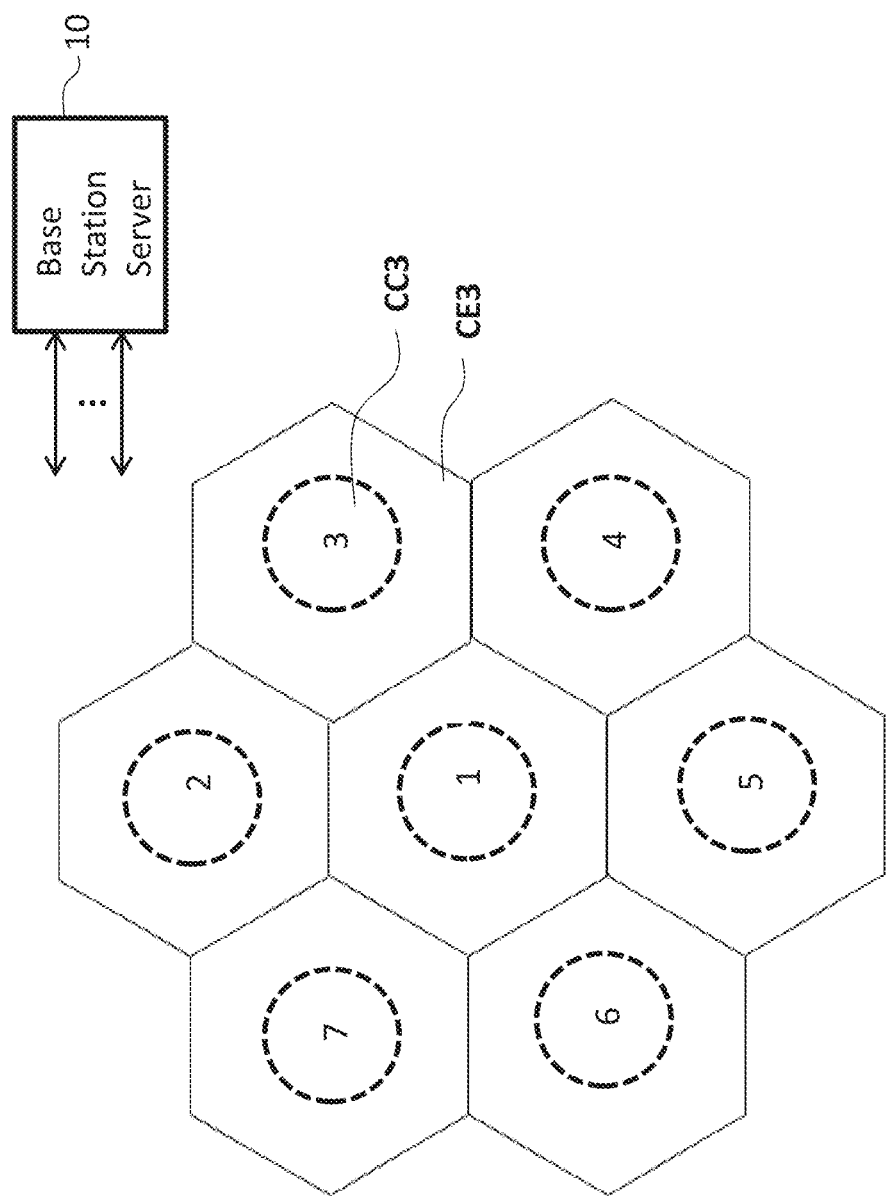
FIG. 2 is a schematic diagram of a cluster consisting of 7 cells.

FIG. 2 is a schematic diagram of a cluster consisting of 7 cells. The method of allocating resources in the present disclosure can be applied in a cluster, for instance, a cluster consisting of cells 1-7. As shown in FIG. 2, each cell is hexagonal with a cell centre ((CC)) region and a cell edge (CE) region. The cell centre region is the area enclosed in the dashed circle line of each cell. For instance, the area labelled as CC3 is the cell centre region of the cell 3. The cell edge region is the area outside the dashed circle line of each cell but still within the broader area defined by the hexagonal shape. For instance, the area labelled as CE3 is the cell edge region of the cell 3. In a 3GPP LTE or LTE-Advanced communication system, the base station/eNodeB can allocate the same set of resources to users under its coverage. For instance, the resources may consist of a block of frequency band resources/sub-bands and timeslot resources/subframes. However, if every eNodeB transmits resources to all users, ICI is likely to arise which will greatly impact cell edge users.

Figure 3:
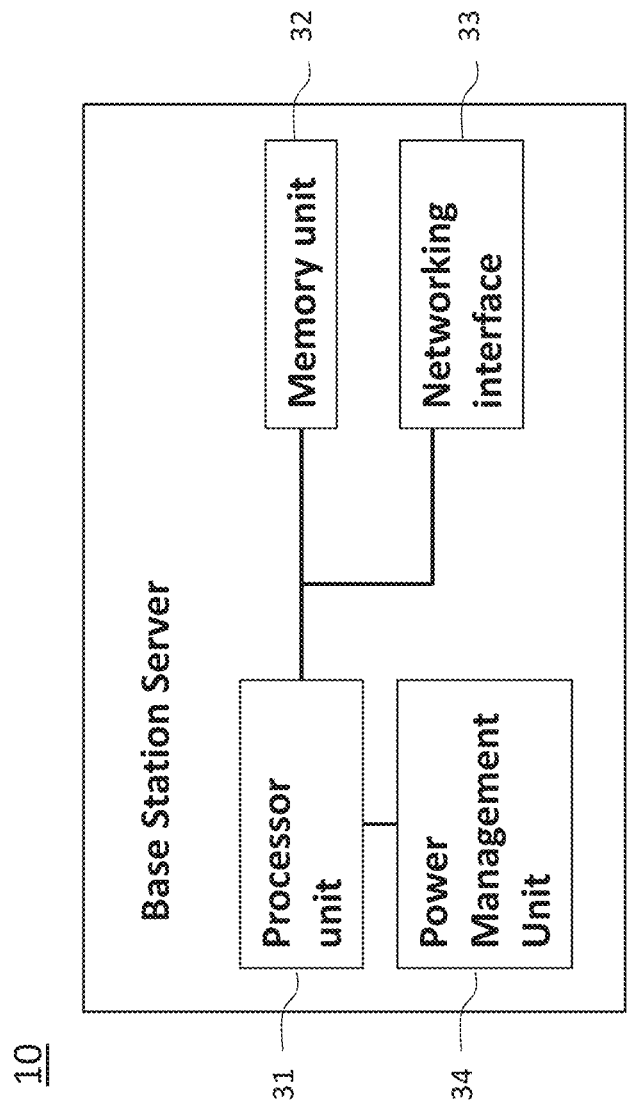
FIG. 3 is a schematic diagram of the physical components of the base station server 10.

FIG. 3 is a schematic diagram of the physical components of the base station server 10. The base station server 10 includes a processor unit 31, a memory unit 32, a networking or input/output interface 33 and a power management unit 34. The processor unit 31 is logically or electrically connected to the memory unit 32, the input/output interface 33 and the power management unit 34. The base station server 10 may be, for example, a blade server, and the processor unit 31 may be, for example, a multi-core processor. The memory unit 32 may include static memory storage devices and dynamic memory storage devices.

The processor unit 31 is configured to implement (or execute) a number of software modules based on program code and/or data stored in the memory unit 32. For example, the memory unit 32 stores program code for implementing software modules such as Radio Resource Control (RRC) processing entity, the Packet Data Convergence Protocol (PDCP) processing entity, the Radio Link Control (RLC) processing entity, the MAC/PHY processing, a cluster packet scheduler and/or a VCP packet scheduler entity. Persons skilled in the art will appreciate that one or more of the software modules could alternatively be implemented in some other way, for example by one or more dedicated electronic circuits, or combinations of electronic circuits and software.

The input/output interface 33 is an interface configured for connecting each baseband unit (BBU) at the base station server 10 with each base station client 11a, 12a and 13a. The power management unit 34 includes a power supply (not shown) configured to provide electrical power to the base station server 10 and management logics (not shown) configured to control power supply to the base station server 10.

Figure 4:
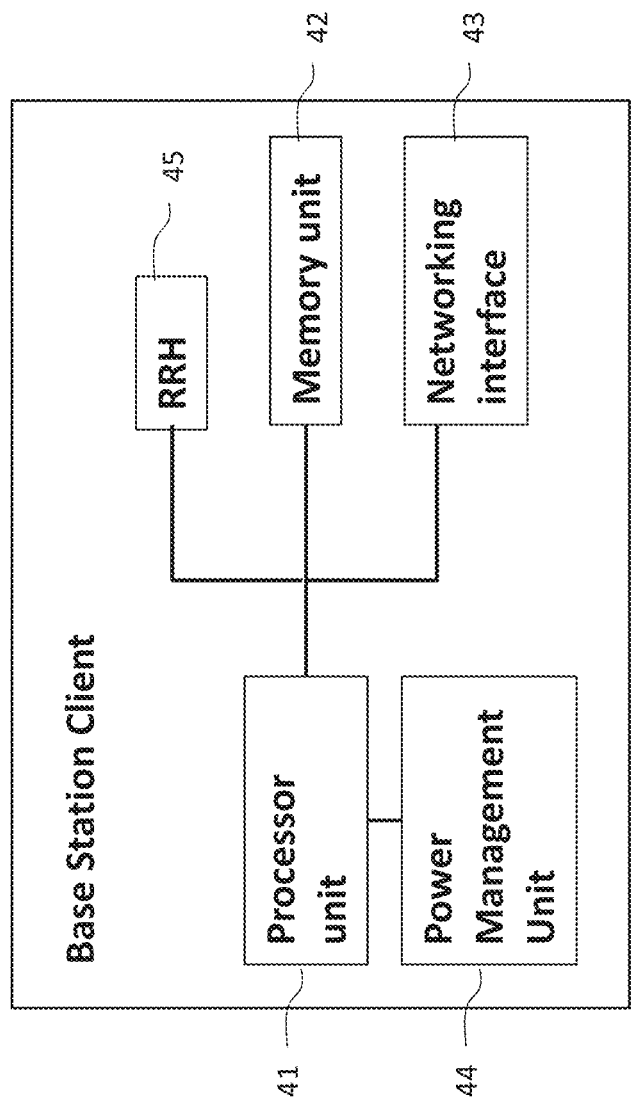

FIG. 4 is a schematic diagram of the physical components of the base station clients 11a, 12a and 13a. Each base station client 11a, 12a and 13a includes a processor unit 41, a memory unit 42, a networking or input/output interface 43, a power management unit 44, and a Remote Radio Head (RRH) 45. The RRH 45 comprises Radio Frequency (RF) circuitry conforming to the 3GPP LTE standard. The RRH 45 may include an antenna (not shown) and RF signal processing components (not shown) such as, but not limited to, a digital-to-analogue signal converter (DAC), an analogue-to-digital signal converter (ADC), an oscillation signal generator, a modulator, a demodulator, a power amplifier, and a bandpass filter.

The processor unit 41 is logically or electrically connected to the memory unit 42, the input/output interface 43, the power management unit 44, and the RRH 45. The processor unit 41 may be a multi-core processor. The memory unit 42 may include static memory storage devices and dynamic memory storage devices. The processor unit 41 is configured to implement (or execute) a number of software modules based on program code and/or data stored in the memory unit 42. For example, the memory unit 42 may store program code for implementing software modules corresponding to a MAC/PHY processing entity. Persons skilled in the art will appreciate that one or more of the software modules could alternatively be implemented in some other way, for example by one or more dedicated electronic circuits.

The input/output interface 43 is an interface configured for connecting the base station clients 11a, 12a and 13a to the base station server 10. The power management unit 44 includes a power supply (not shown) configured to supply electrical power to the base station clients 11a, 12a and 13a and management logics (not shown) configured to control power supply to the base station clients 11a and 12a, 13a.

Figure 5:
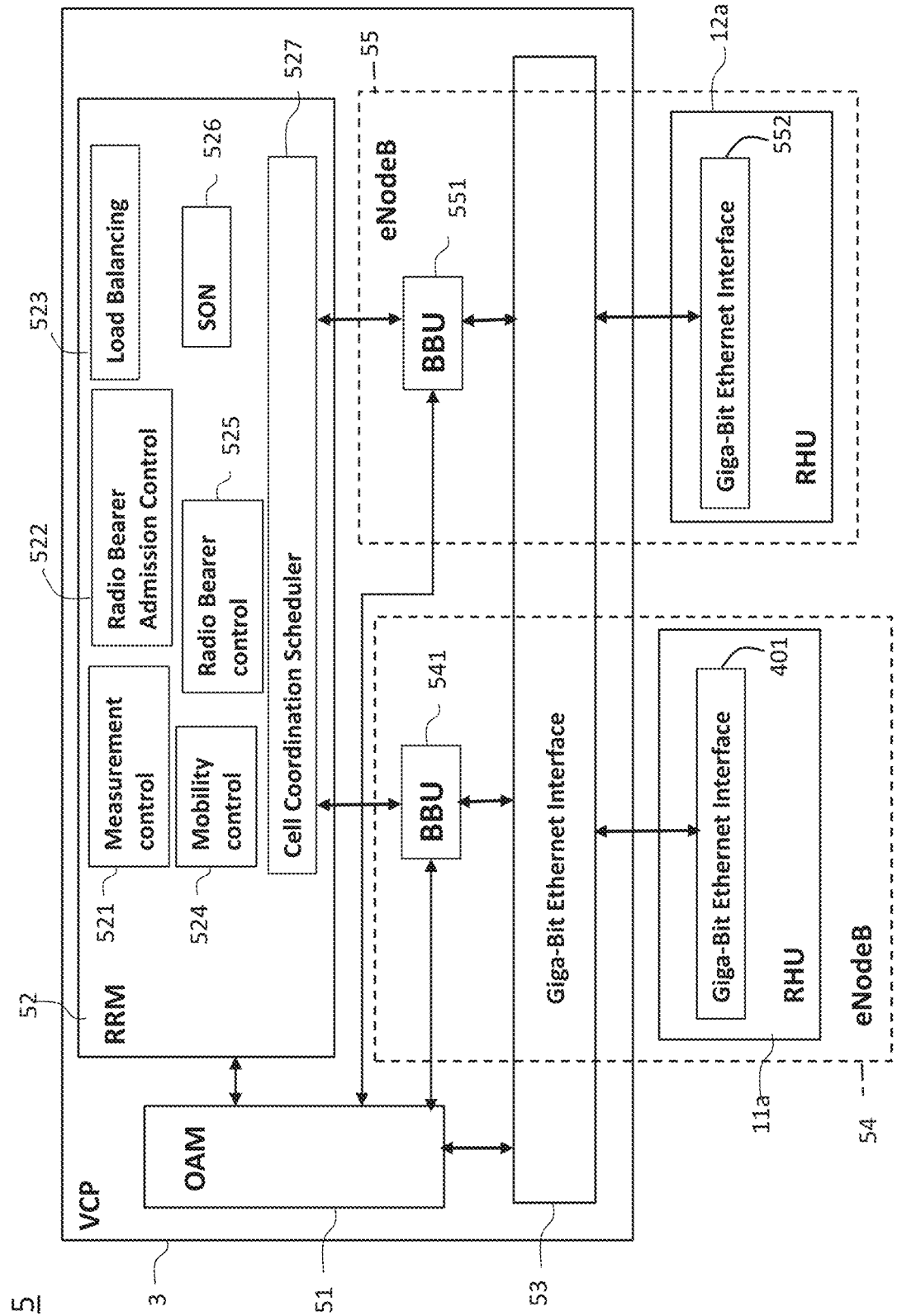
FIG. 5 is a schematic diagram of the functional components (shared functional components) used to manage the BBUs located at the base station server 10.

FIG. 5 is a schematic diagram of the functional components (shared functional components) implemented on a virtualized cloud processor (VCP) 5 to manage the BBUs located at the base station server 10. In FIG. 5, only the VCP 5 as part of the system 1 (more specifically, only two of the BBUs 541, 551 and two of the base station clients 11a, 12a) is illustrated. Persons skilled in the art will appreciate that the base station server 10 can include more than 2 BBUs respectively connected to their base station clients. In FIG. 5, the baseband processing typically performed by a conventional eNodeB is performed by eNodeBs 54 and 55 comprising BBUs 541 and 551 respectively and corresponding base station clients 11a and 12a respectively. The BBUs 541 and 551 may be connected with more than two base station clients and configured to perform complete eNodeB functionality along with each of the connected base station clients.

The base station server 10 includes a carrier Ethernet Internet Protocol (IP) interface in the form of a Giga-bit Ethernet interface 53. BBUs 541 and 551 are connected to corresponding base station clients 11a and 12a via the Giga-bit Ethernet interface 53 and Giga-bit Ethernet interfaces 401 and 552 of the base station clients 11a and 12a.

The base station server 10 also includes a Radio Resource Management (RRM) 52 including: a measurement control entity 521, a radio bearer admission control entity 522, a load balancing entity 523, a mobility control entity 524, a radio bearer control entity 525, a Self-Organizing Network (SON) entity 526 and a cell coordination scheduler 527. BBUs 541 and 551 are connected to the measurement control entity 521, the radio bearer admission control entity 522, the load balancing entity 523, the mobility control entity 524, the radio bearer control entity 525 and the SON entity 526 via the cell coordination scheduler 527. The cell coordination scheduler 527 performs radio resource allocation and packet scheduling for each BBU 541 and 551 and corresponding base station clients 11a and 12a. The cell coordination scheduler 527 implements a cluster packet scheduler for clusters such as those shown in FIGS. 2, 6, 8 and 12.

The measurement control entity 521 controls broadcasting or transmission of dedicated control/signalling information such that a user equipment (UE) corresponding to a BBU can, according to the control/signalling information, perform measurements for intra/inter-frequency mobility. The radio bearer admission control entity 522 determines whether a new radio bearer can be accepted by the system 5 according to currently available radio resource (such as the currently available radio resource of the serving cell base station clients 11a and 12a). The load balancing entity 523 performs load balancing algorithms (such as intra-frequency, inter-frequency or inter-RAT re-selections/handovers). The mobility control entity 524 performs determinations related to mobility of UEs (for example, during handover and Tracking Area Update (TAU)). The radio bearer control entity 525 establishes, maintains, and releases radio bearers, and configures radio resources associated with radio bearers. The SON entity 526 is arranged to exchange information (such as an Automatic Neighbour Relation function) between neighbouring eNodeBs 54 and 55. The SON entity 526 may perform automatic Physical Cell Identity (PCI) selection, dynamic configuration of X2/S1 interfaces, Random Access Channel (RACH) parameter optimization, and mobility parameter optimization.

The base station server 10 also includes an operation administration monitoring (OAM) entity 51. The OAM entity 51 is logically connected to the RRM entity 52, each BBU 541 and 551 and the Giga-bit Ethernet interface 53. The OAM entity 51 performs OAM/control operations. In particular, the OAM entity 51 performs OAM/control of a MAC sub-layer processing entity (not shown) and a PHY sub-layer processing entity (not shown). This OAM/control typically involves relevant MAC and PHY sub-layer configuration information. The OAM entity 51 may interact with the RRM entity 52 and directly transmit/receive control/signalling information to/from a RRC sub-layer processing entity (not shown) of each BBU 541 and 551. Also, the OAM entity 51 may transmit/receive, over the Giga-bit Ethernet interface 53, OAM/control and configuration information to/from a corresponding OAM entity (not shown) of each base station client 11a and 12a.

In C-RAN, the cooperation among cells is important because it can greatly help to reduce ICI. C-RAN may require integrated packet scheduling and ICI solutions to optimise the benefits of the system architecture shown in FIGS. 1, 2 and 5.

In order to solve the problem of ICI in a LTE system, the present disclosure provides a method involving allocating resources to users in adjacent cells of a cell cluster utilising a resource restriction strategy based on allocation priorities assigned to each cell. The solution comprises the following steps: (a) classifying users in each of adjacent cells in a cellular communication network into cell edge users and cell centre users; (b) determining allocation priorities for each of the adjacent cells; and (c) allocating resources to the users in each of the adjacent cells based on the allocation priorities, except that resources allocated to cell edge users in one of the adjacent cells are restricted from use by other adjacent cells having lower allocation priorities.

Figure 6:
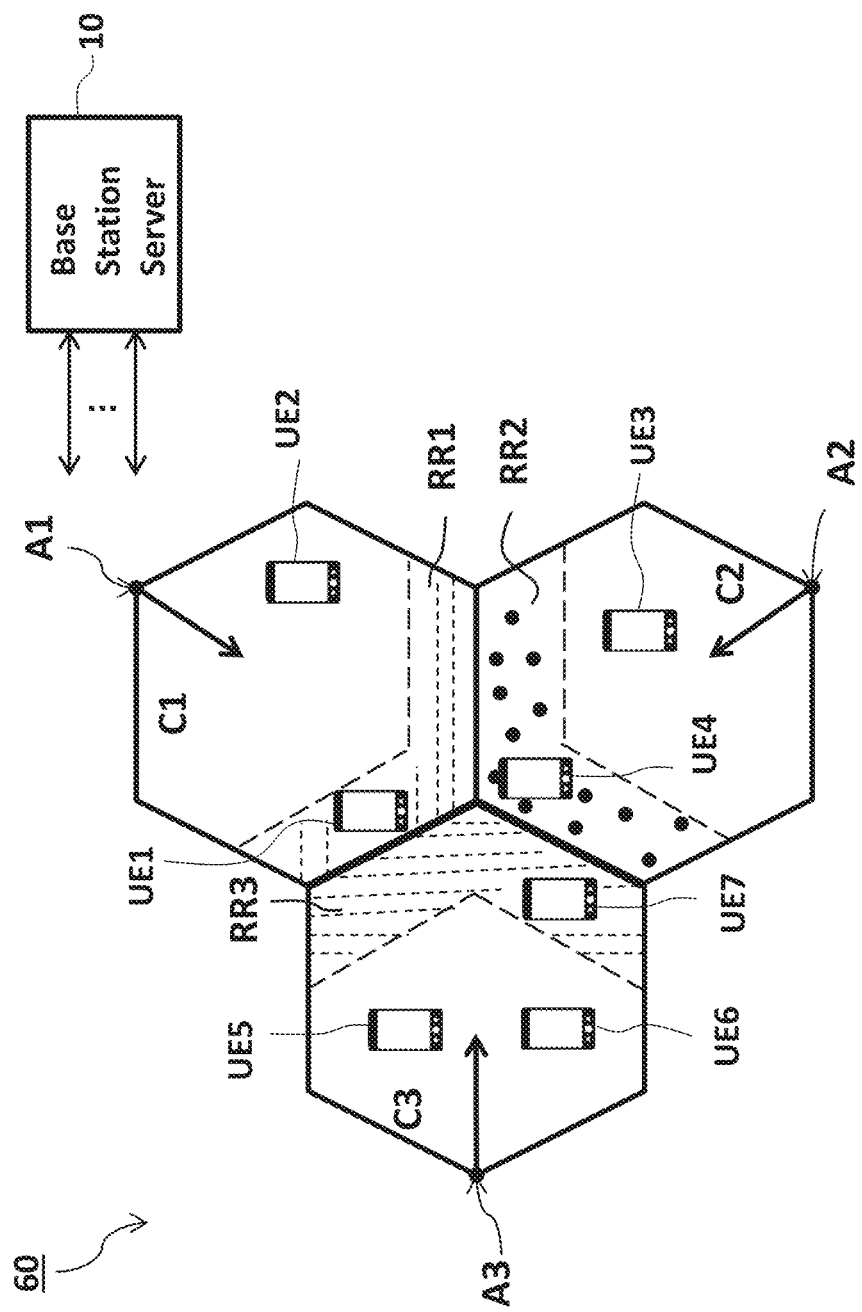
FIG. 6 is a schematic diagram illustrating a cluster 60 consisting of 3 cells.

The method may be applied to any C-RAN network. Under practical conditions the method reduces or eliminates ICI whilst also providing good and fair packet scheduling within each cell of a cell cluster. The method may be explained with reference to a cluster comprising C cells with centralized control in which all available radio resource blocks (RBs) are used at least once (e.g., C=3 cells) during a configured allocation period/interval. The cluster of 3 cells shown in FIG. 6 is merely an example but not intended as limiting on the method of the disclosure. Persons skilled in the art will readily appreciate and understand that the number of cells in each cluster is set by a planning and optimization team within a mobile network operator.

Step (a) may be carried out based on reference signal strengths of each of the users as follows. For each user in a cell, the eNodeB with the greatest pilot signal is the serving cell. For each transmit time interval (TTI) or a configured window interval period P, users in a cell cluster are divided into CC users or CE users based on signal-to-interference-noise-ratio (SINR) reported by the users. For example, if the pilot signal (or SINR) of a serving cell reported by a user A is greater than pilot signal strengths (or SINR) of other cells by a threshold amount delta $\Delta$ (which can be set by the mobile network operator or according to an algorithm), the cell coordination scheduler 527 of the base station server 10 may consider the user A as a CC user. On the other hand, if the pilot signal (or SINR) of a serving cell reported by a user B is not greater than pilot signal strengths (or SINR) of other cells by the threshold amount delta $\Delta$, the cell coordination scheduler 527 of the base station server 10 may consider the user B as a CE user.

In an alternative example, when another user C respectively receives 2 or more pilot signals from 2 or more cells with nearly equal signal strength, the cell coordination scheduler 527 of the base station server 10 may consider this user C as a CE user.

FIG. 6 is an exemplary schematic illustrating a cluster 60 consisting of 3 cells, C1, C2 and C3. Antenna A1, A2, A3 are respectively configured to transmit RF signals to, or to receive RF signals from, any user equipment (UE) in the cells C1, C2, C3. The restricted radio resources RR1, RR2 and RR3 shown in FIG. 6 refer to radio resource blocks restricted from being used by other CE UEs in other cells in the cluster 60.

Figure 7:
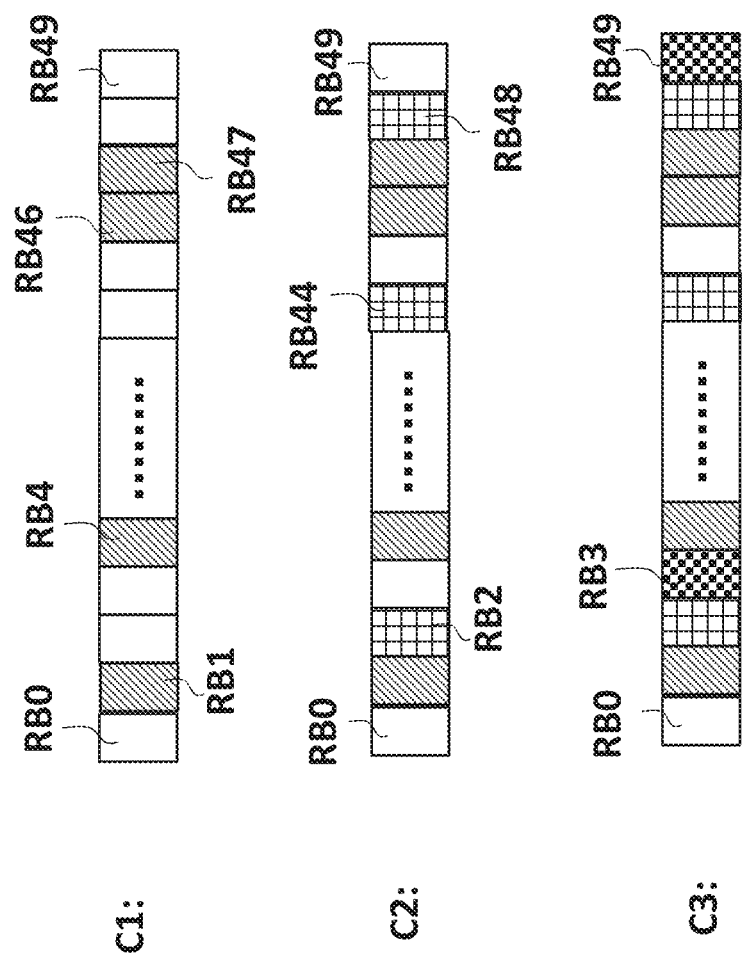
FIG. 7 is a schematic diagram illustrating radio resource blocks respectively allocated to users in cells C1, C2, C3 in the cluster 60.

As shown in FIG. 6, the eNodeBs in the cluster of 3 cells are communicatively connected to the base station server 10 and are also centrally controlled by the base station server 10. FIG. 7 is an exemplary schematic illustrating radio resource blocks respectively allocated to CE UEs in cells C1, C2, C3 in the cluster 60. There are 50 radio resource blocks RB0, RB1, . . . , RB49 in a configured bandwidth, for example 100 MHz. The base station clients 11a, 12a and 13a are deployed respectively at antenna locations A1, A2 and A3 in FIG. 6, and base station clients 11a, 12a and 13a correspond to BBUs which are all managed by the same cell coordination scheduler 527. For example, the BBUs connected to the base station clients 11a, 12a and 13a may first receive channel quality metrics such as Channel Quality Indicator (CQI) and Reference Signal Receive Power (RSRP) of all UEs from the base station clients 11a, 12a, 13a, and then report all channel quality metrics of all UEs in the cluster 60 to the cell coordination scheduler 527.

The resource allocation to users in adjacent cells utilising a restriction strategy based on allocation priorities assigned to each cell shown in FIG. 7 is explained below with reference to the cluster 60 shown in FIG. 6. It is assumed that step (a) noted above has been executed previously. The determination of CC UEs and CE UEs in each cell in the cluster 60 may be performed with a configured window interval period P longer than a resource allocation period.

After performance of step (a) the base station server 10 can allocate RBs to CC UE(s) and CE UE(s) in each cell of the cluster 60 consecutively. In operation, the BBU corresponding to the cells C1, C2, C3 can allocate resource blocks to CC UEs and CE UEs in cells C1, C2, C3 consecutively during the resource allocation period. In an alternative embodiment, the cell coordination scheduler 527 of the base station server 10 may allocate resource blocks to CC UEs and CE UEs in cells C1, C2, C3 simultaneously during the resource allocation period.

The cell coordination scheduler 527 or the BBU corresponding to the cells C1, C2 and C3 may perform steps (b) and (c) together as explained below. First, the cell coordination scheduler 527 or the relevant BBU determines allocation priorities for each of the adjacent cells. In FIG. 6 the allocation priority is: C1 has a highest allocation priority followed by C2 and C3. The relevant BBU or the cell coordination scheduler 527 then allocates RBs to the highest allocation priority cell C1. Radio resource blocks RB1 corresponding to label C1 shown in FIG. 7 are the resource blocks allocated to the CE UEs in the cell C1. The cell C2 has a lower allocation priority than that of cell C1 but higher than that of cell C3. Therefore, when the resource blocks are allocated to the CE UEs in the cell C2, the resource blocks allocated to the cell C1 are restricted resource blocks. In other words, the CE UEs in the cell C2 will not be allocated with the resource blocks already allocated to the CE UEs in the cell C1. Similarly, when the resource blocks are allocated to the CE UEs in the cell C3, the resource blocks allocated to the cells C1 and C2 are restricted resource blocks. The resource blocks allocated to the cell C2 are the ones with sectioned pattern such as radio resource block RB2. Therefore, the CE UEs in the cell C3 will not be allocated with the resource blocks already allocated to the cells C1 and C2. Finally, in the present resource allocation period, the CE UEs in the cell C3 are allocated with radio resource blocks with checked patterns such as radio resource block RB49.

After steps (b) and (c), the cell coordination scheduler 527 or the BBU changes the allocation priorities of cells C1, C2, C3 in the cluster 60. The change may be, for example, rotating the allocation priority ranks of cells C1, C2, C3 in the cluster 60. In an alternative embodiment, the change may be performed along with a resource allocation algorithm such that the UE with metrics corresponding to a longer waiting period or more urgent downlink data transmission can be assigned a higher allocation priority.

The base station server 10 can be considered as a Digital Unit (DU) or a DU cloud, which controls all cells within a cluster. The base station server 10 collects feedback/report information from users/UEs and decides how to allocate radio resources to each UE. Resource block (RB) in the present disclosure is the same as PRB (Physical RB or a pair of RB). In all embodiments of the present disclosure, CC UEs in each cell may use radio resource block already allocated to CE UE in other cells.

The cell coordination scheduler 527 or the BBU corresponding to cells in a cluster may allocate the RBs to CC UEs and CE UEs according to a packet scheduling algorithm, which performs an intra-cell resource allocation, for example, Max-rate (MR), Proportional Fair (PF), Modified-Largest Weighted Delay First (M-LWDF) Algorithm, Exponential Rule Algorithm (EXP), Quality-Driven Scheduling (Q-DS) Algorithm, Robust and QoS-Driven Scheduling (RQ-DS).

For example, a PF algorithm can be modified as an intra-cell radio resource algorithm C1 for allocating RBs to CC users and CE users in each cell of a cluster according to the following mathematical expressions (1), (2), (3), (4), (5):

$$CC, CE\mu_{i,j}(t) = \frac{r_{i,j}(t)}{R_i(t)}; \quad \text{expression (1)}$$

$$\text{for } CC, CE \; R_i(t+1) = \left(1 - \frac{1}{t_c}\right) \times R_i(t) + \frac{1}{t_c} \times rtot_i(t+1); \quad \text{expression (2)}$$

$$\text{for } CC \; rtot_i(t+1) = \sum_{j=1}^{RB_{CC}} I_{i,j}(t+1) \times r_{i,j}(t+1); \quad \text{expression (3)}$$

$$\text{for } CE \; rtot_i(t+1) = \sum_{j=1}^{RB_{CE}} I_{i,j}(t+1) \times r_{i,j}(t+1); \quad \text{expression (4)}$$

$$I_{i,j}(t+1) = \begin{cases} 1 & \text{if packets of user } i \text{ are scheduled on } RB \; j \text{ at } TTI \text{ "}t+1\text{"} \\ 0 & \text{if packets of user } i \text{ are not scheduled on } RB \; j \text{ at } TTI \text{ "}t+1\text{"} \end{cases} \quad \text{expression (5)}$$

In the mathematical expressions (1)-(5) shown above, the parameter i refers to user i; the parameter j refers to jth RB, $\mu_{i,j}(t)$ is the priority of user i on RB j at time t; $r_{i,j}(t)$ is the instantaneous data rate of user i on RB j at time t; $R_i(t)$ is the average throughput of user i at time t; $t_c$ is a time constant; $rtot_i(t+1)$ is the total data rate being used to transmit packets to user i at time t+1; $l_{i,j}(t+1)$ is the indicator function of the event that packets of user i are selected for transmission on RB j at time t+1; $RB_{CC}$ is the maximum available number of RBs for CC users; and $RB_{CE}$ is the maximum available number of RBs for CE users. In the present disclosure, $\mu_{i,j}(t)$ of the mathematical expression (1) can be used for calculating metrics of a UE according to its reported channel state information.

In addition to the aforementioned PF algorithm proposed for the major step (b) on allocating radio resource to CC users and CE users in each cell in the cluster by the cell coordination scheduler 527, there is proposed another Algorithm C2 for wireless communication system conforming 3GPP LTE-Advanced standard. The Algorithm C2 is an additional algorithm that is better suited to a 3GPP LTE-Advanced communication system when there are multiple component carriers or carrier aggregation is supported in the system.

The Algorithm C2 can be used as an intra-cell radio resource algorithm for scheduling packet/allocate radio resource blocks similar to Optimized Cross-Component Carrier M-LWDF algorithm. The algorithm C2 can be used by the cell coordination scheduler 527 to allocate RBs to all UEs in a cell/cells in the cluster at the same time. This Algorithm C2 can support real time (RT) and non-RT services as well as support 3GPP LTE-Advanced system or wireless communication system with multiple component carriers.

The base station server 10 is used as a centralized scheduler in the Algorithm C2, and the cell coordination scheduler 527 can control the whole bandwidth of all component carriers and compute the metrics of all users/UEs in each cell in the cluster using the mathematical expressions (6), (7), (8) below and then make the decision for packet scheduling/resource allocation.

$$M_{k,i,j} = a_i W_i \frac{r_{k,i,j}(t)}{\frac{R_i(t)}{N_i}}; \text{ with} \quad \text{expression (6)}$$

$$a_i = -\frac{(\log \delta_i)}{\tau_i}. \quad \text{expression (7)}$$

In the mathematical expressions (6)-(7), $W_i(t)$ is the Head of Line (HOL) packet delay of user i at time t, $\tau_i$ is the delay threshold of user i (before the first HOL packet of user i is transmitted in downlink), $\delta_i$ denotes the maximum probability for HOL packet delay of user i to exceed the delay threshold of user i; $N_i$ is the number of CCs on which packet can be transmitted to the user i in downlink; $r_{k,i,j}(t)$ is the instantaneous achievable data rate of user i on the kth component carrier at the $j^{th}$ RB; $R_i$ is total average data rate of user i in all CCs as defined in following:

$$R_i(t) = \left(1 - \frac{1}{t_c}\right) \times R_i(t-1) + \frac{1}{t_c} \times r_i(t-1). \quad \text{expression (8)}$$

In the mathematical expression (7), $\tau_i$ can be regarded as service dependant buffer delay threshold of the user i; $\delta_i$ can be regarded as service dependant packet loss rate threshold of user i. As such, $\alpha_i W_i$ in the mathematical expression (6) can be regarded as quality of service (QoS) requirement of bearer for user i. Also, the resultant parameter $M_{k,i,j}$ in the mathematical expression (6) includes the above-mentioned QoS requirement of bearer for the user/UE i, and the priority of the user/UE i on radio resource block j at time t. Therefore, the resultant parameter $M_{k,i,j}$ can be used in calculating metrics of an active user/UE i according channel state information fed back from the active UE i, the amount of data waiting to be transmitted to each active UE i and a head of line packet delay of the active UE i.

In the mathematical expression (8), $r_i(t)$ is the total instantaneous data rate in all assigned RBs in all CCs of the user i in previous time slot that had been transmitted. Also, $\alpha_i$ in the mathematical expression (7) may represent urgency of a packet transmission to the user i related to QoS. The delay threshold, $\tau_i$, may represent how much more time the packet for the user i has to wait before transmission in downlink.

When the Algorithm C2 is applied in a wireless communication system with only a single carrier, then the parameter "k" in previous expression (6) can be omitted.

In order to meet stringent QoS requirements of some traffic types, for example, voice over Internet Protocol (VoIP) packets and packets for re-transmission due to hybrid automatic repeat request (HARQ) can be assigned with higher priority rank in the intra-cell resource allocation process. For example, in order to meet time-sensitive requirement of VoIP, a pre-configured percentage of CC RBs can be allocated to CC users using VoIP only. On the other hand, for VoIP users located in CE region of each cell, the VoIP packets can be allocated with RBs before other traffic types of other users in CE area of that cell.

The following paragraphs provide a detailed description of inter-cell radio resource allocation and intra-cell radio resource allocation in accordance with FIGS. 6 and 7. In FIG. 6, it is assumed that cells C1, C2 and C3 are managed by the BBU 541 of the base station server 10. In the illustrative example below it is also assumed that the allocation priority rank in the cluster has been determined as C1>C2>C3 by the cell coordination scheduler 527 or the BBU for the present allocation period or the present TTI. Therefore, the cell coordination scheduler 527 or the BBU performs (i) the intra-cell resource allocation for cell C1: then (ii) performs intra-cell resource allocation for cell C2 having regard to resource restrictions determined at step (i); and finally (iii) performs intra-cell resource allocation for cell C3 having regard to resource restrictions determined at steps (i) and (ii) for the present TTI.

There are 2 active UEs in the cell C1 in the present resource allocation period or the present TTI. The active UEs refer to UEs to which there are downlink data waiting to be transmitted. Persons skilled in the art will appreciate that there may be other UEs in the service coverage area of the cell C1 but they are not active UEs. The cell coordination scheduler 527 or the BBU 541 performs step (c) as an intra-cell resource allocation for the cell C1 during the present TTI. The cell coordination scheduler 527 or the BBU 541 firstly determines UE1 and UE2 in a scheduling list for the cell C1. Then, the coordination scheduler 527 or the BBU 541 calculates metrics of UEs for each RB from RB0 to RB49 by, for example, using the expressions (6)-(8). For example, the coordination scheduler 527 or the BBU 541 determines RB allocation for UE1 and UE2 in the cell C1 in accordance with several factors, for example, the amount of downlink data to be transmitted respectively to UE1 and UE2, the channel condition information or channel state information (CSI) fed back respectively by the UE1 and UE2, and the amount of data able to be transmitted on each RB.

Detailed operations are provided below for step (i) the intra-cell RB allocation in the cell C1. It is assumed that, at the present TTI, there are 750 megabytes (MB) downlink data waiting in buffer memory at the base station server 10 to be transmitted to the UE1 and 800 MB downlink data to be transmitted to UE2. The coordination scheduler 527 or the BBU 541 may determine that each RB is capable to transmit 500 MB to a particular UE in cell C1. According to CSI fed back respectively from UE1 and UE2, the coordination scheduler 527 or the BBU 541 determines RB0 not suitable for downlink transmission to UE1 and UE2 at the present TTI, but determines to allocate RB1 to UE1, RB4 to UE2, RB46 to UE1 and RB47 to UE2. For example, the coordination scheduler 527 or the BBU 541 determines the metrics of UE1 on RB1 calculated according to the mathematical expressions (6)-(8) greater than that of UE2 on RB1, so the coordination scheduler 527 or the BBU 541 determines to allocate RB1 to UE1 at the present TTI. Similarly, the coordination scheduler 527 or the BBU 541 determines the metrics of UE2 on RB4 calculated according to the expressions (6)-(8) greater than that of UE1 on RB4, so the coordination scheduler 527 or the BBU 541 determines to allocate RB4 to UE2 at the present TTI. The same determination principle applies to RB allocation of RB46 to UE1 and RB47 to UE2. When all downlink data waiting to be transmitted to all UEs in the current serving cell C1 has been allocated the required amount of RBs, the coordination scheduler 527 or the BBU 541 stops allocating RBs in the current serving cell C1 and continues inter-cell RB allocation. Since UE1 is CE UE, the region RR1 represents restricted RBs for other cells in the cluster, which had been allocated to UE1 for the present TTI.

After the RB allocation is determined for the cell C1, the cell coordination scheduler 527 or the BBU 541 performs step (ii). That is, performance of the intra-cell RB allocation in cell C2 having regard to RB restriction determined at step (i). The cell coordination scheduler 527 or the BBU 541 determines that UE3, UE4 in the cell C2 are active UEs for the present TTI, and thus list UE3, UE4 in the scheduling list for the present TTI. Then, the cell coordination scheduler 527 or the BBU 541 calculates metrics of UE3, UE4 on each RB from RB0 to RB49 by, for example, using the mathematical expressions (6)-(8), in accordance with several factors, for example, the amount of downlink data to be transmitted respectively to UE3, UE4, the channel condition information or channel state information (CSI) fed back respectively by the UE3, UE4, and the amount of data able to be transmitted on each RB.

Detailed operations are provided below for step (ii) the intra-cell RB allocation in cell C2 with RB restrictions. It is assumed that, at the present TTI, there are 1,500 MB downlink data waiting in buffer memory at the base station server 10 to be transmitted to the UE3 and 900 MB downlink data to be transmitted to UE4. UE4 is CE UE so it is blocked from using restricted RBs determined at the step (i). UE3 is CC UE so it can re-use any RB previously allocated to UE1 or UE2 at step (i). The coordination scheduler 527 or the BBU 541 may determine that each RB is capable to transmit 500 MB to a particular UE in the cell C2. According to CSI fed back respectively from UE3 and UE4, the coordination scheduler 527 or the BBU 541 calculates metrics of UE3, UE4 on each RB from RB0 to RB49.

For example, the coordination scheduler 527 or the BBU 541 then determines RB0 not suitable for downlink transmission to UE3, UE4 in the cell C2 at the present TTI, but determines metrics of UE3 on RB1 as the highest. Since UE3 is CC UE, UE3 can be allocated with RB1. For example, the coordination scheduler 527 or the BBU 541 determines the metrics of UE4 on RB4 calculated according to the expressions (6)-(8) greater than that of UE3 on RB4, but UE4 is CE UE and the RB4 is a restricted RB. In this case, the coordination scheduler 527 or the BBU 541 determines to discard UE4 on the restricted RB4 but allocate RB4 to UE1 at the present TTI. Similarly, the coordination scheduler 527 or the BBU 541 determines the metrics of UE4 on RB44 calculated according to the expressions (6)-(8) greater than that of UE3 on RB44 and RB48, so the coordination scheduler 527 or the BBU 541 determines to allocate RB44 and RB48 to UE4 at the present TTI. The same determination principle applies to RB allocation of RB46 to UE3. When all downlink data waiting to be transmitted to all UEs in the current serving cell C2 has been allocated the required amount of RBs, the coordination scheduler 527 or the BBU 541 stops allocating RBs in the current serving cell C2 and continues inter-cell RB allocation. Since UE4 is CE UE, the region RR2 represents restricted RBs for other cells in the configured cluster, which had been allocated to UE4 for the present TTI.

After the RB allocation is determined for the cells C1 and C2, the cell coordination scheduler 527 or the BBU 541 performs step (iii). That is, intra-cell resource allocation for cell C3 having regard to resource restriction determined at steps (i) and (ii). The cell coordination scheduler 527 or the BBU 541 determines that UE5, UE6, UE7 are active UEs for the present TTI, and thus list UE5, UE6 and UE7 in the scheduling list for the present TTI. Then, the cell coordination scheduler 527 or the BBU 541 calculates metrics of UE3. UE4 on each RB from RB0 to RB49 by, for example, using the mathematical expressions (6)-(8), in accordance with several factors, for example, the amount of downlink data to be transmitted respectively to UE5, UE6 and UE7, the channel condition information or channel state information (CSI) fed back respectively by the UE5, UE6 and UE7, and the amount of data able to be transmitted on each RB.

Detailed operations are provided below for step (iii) the intra-cell RB allocation in cell C3 with RB restrictions. It is assumed that, at the present TTI, there are 450 MB downlink data waiting in buffer memory at the base station server 10 to be transmitted to the UE5, 600 MB downlink data to be transmitted to UE6 and 250 MB downlink data to be transmitted to UE7. UE7 is CE UE so it will be blocked from using the restricted RBs determined at steps (i) and (ii). UE5 and UE6 are CC UEs so they can re-use any RB previously allocated to UEs at the step (i) and (ii). The coordination scheduler 527 or the BBU 541 may determine each RB is capable to transmit 500 MB to a particular UE in cell C3. According to CSI fed back respectively from UE5. UE6, UE7, the coordination scheduler 527 or the BBU 541 calculates metrics of UE5, UE6, UE7 on each RB from RB0 to RB49.

For example, the coordination scheduler 527 or the BBU 541 then determines metrics of UE5 on RB2 as the highest. Since UE5 is CC UE, UE5 can still be allocated with RB2. After this intra-cell allocation of RB2 to UE5, the downlink data requirement of UE5 is satisfied, so the coordination scheduler 527 or the BBU 541 removes UE5 from the scheduling list. The coordination scheduler 527 or the BBU 541 then determines the metrics of UE7 on RB4 calculated according to the expressions (6)-(8) greater than that of UE6 on RB4, but UE7 is CE UE and the RB4 is restricted RB to CE UE in the cell C3. In this case, the coordination scheduler 527 or the BBU 541 determines to discard UE7 on the restricted RB4 but allocate RB4 to UE6 at the present TTI. Similarly, the coordination scheduler 527 or the BBU 541 determines the metrics of UE7 on RB3 calculated according to the expressions (6)-(8) greater than that of UE6 on RB3, so the coordination scheduler 527 or the BBU 541 determines to allocate RB3 to UE7 at the present TTI. The same determination principle applies to RB allocation of RB49 to UE6. When all of downlink data waiting to be transmitted to all UEs in current serving cell C3 have been allocated required amount of RBs, the coordination scheduler 527 or the BBU 541 stops allocating RB in the current serving cell C3 and the inter-cell RB allocation is also completed for the current TTI.

Figure 8:
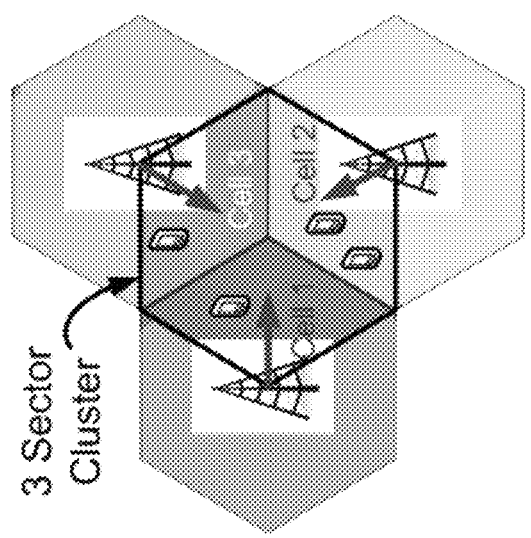
FIG. 8 is a schematic diagram illustrating a network layout of a 3-sector cluster.
Figure 9:
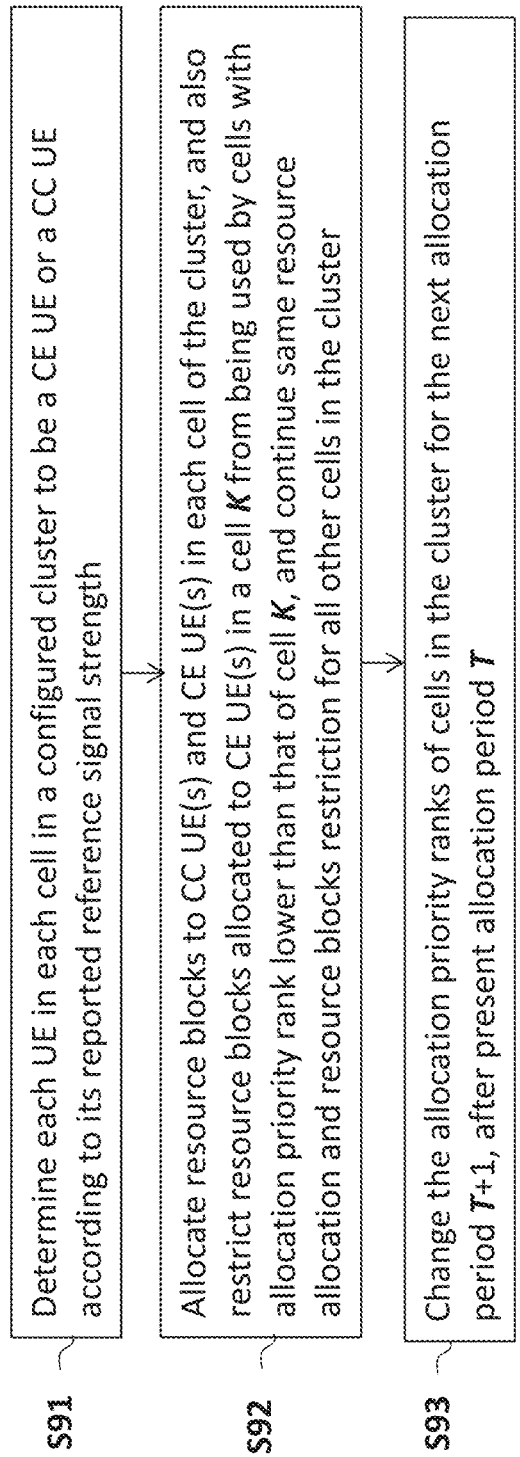
FIG. 9 is a flowchart illustrating the method of allocating radio resources in a cluster by using dynamic ICI avoidance and radio resource restriction.

FIG. 8 is an exemplary schematic diagram illustrating a network layout of a 3-sector cluster in accordance with a first exemplary embodiment of the present disclosure. FIG. 9 is a flowchart illustrating the method of allocating radio resource in a cell cluster by using dynamic inter-cell interference avoidance and radio resource restriction in accordance with a first exemplary embodiment of the disclosure. The method of allocating radio resources in a cell cluster in the first exemplary embodiment can be applied to any cluster of N cells, where N is greater than or equal to 3. For example, the method in the first exemplary embodiment can be applied to the cluster shown in FIG. 6. However, the detailed operations of the method of the first exemplary embodiment will be explained below with reference to the 3-sector cluster shown in FIG. 8.

In step S91 of FIG. 9, the coordination scheduler 527 or the BBU 541 of the base station server 10 determines each UE in each cell in a cluster to be a CE UE or a CC UE according to its reported reference signal strength. The coordination scheduler 527 or the BBU 541 is connected to RHUs respectively at Cell 1, Cell 2 and Cell 3. The cluster shown in FIG. 8 consists of 3 sectors respectively belonging to Cell 1, Cell 2 and Cell 3. The BBU 541 corresponds to RHUs at Cell 1, Cell 2 and Cell 3. Additionally, the coordination scheduler 527 or the BBU 541 is responsible for intra-cell resource allocation in Cell 1, Cell 2 and Cell 3, and is also responsible for inter-cell resource allocation for the 3-sector cluster.

For each user in a cell, the eNodeB with the greatest pilot signal is the serving cell. For example, when the pilot signal (or SINR) of a serving cell reported by a UE A is greater than pilot signal strengths (or SINR) of other cells by the threshold amount delta Δ (pre-configured by the mobile network operator or according to an algorithm), the cell coordination scheduler 527 of the base station server 10 determines this UE A to be a CC UE. On the other hand, when the pilot signal (or SINR) of a serving cell reported by a UE B is not greater than pilot signal strengths (or SINR) of other cells by the threshold amount delta Δ, the cell coordination scheduler 527 of the base station server 3 determines this UE B to be a CE UE.

In an alternative example, when another UE C respectively receives 2 or more pilot signals from 2 or more cells of nearly equal signal strength, the cell coordination scheduler 527 of the base station server 10 can determine this UE C to be a CE UE.

In step S92, the cell coordination scheduler 527 or the BBU 541 allocates radio resource blocks to CC UE(s) and CE UE(s) in each cell of the cluster, and also restricts radio resource blocks allocated to CE UE(s) in a cell K from being used by cells with allocation priorities lower than that of the cell K, and continues the same procedure of radio resource allocation and radio resource block restriction for all other cells in the cell cluster. For example, the cell coordination scheduler 527 or the BBU 541 determines in advance that the allocation priority rank of cells in the 3-sector cluster is: Cell 1>Cell 2>Cell 3. Then, the cell coordination scheduler 527 or the BBU 541 performs (1-1) the intra-cell radio resource block allocation for Cell 1 for the present allocation period T; then (1-2) performs intra-cell radio resource block allocation for Cell 2 with radio resource block restriction determined at the step (1-1) for the present resource allocation period T; and finally performs intra-cell radio resource block allocation for Cell 3 with radio resource block restriction determined at the steps (1-1) and (1-2) for the present resource allocation period T. The detailed operations of steps (1-1), (1-2), (1-3) are similar to those in above-mentioned steps (i), (ii) and (iii).

In step S93, the cell coordination scheduler 527 or the BBU 541 changes the allocation priority of cells in the cluster for the next resource allocation period T+1, after the present resource allocation period T. The basic unit of the resource allocation period can be, for example, a TTI. The change of resource allocation priority of cells in the cluster may be, for example, (a) randomly selected; (b) selected by round-robin or (c) configured by another algorithm to improve the fairness of resource allocation to UEs in different cells of the cell cluster.

Figure 10:
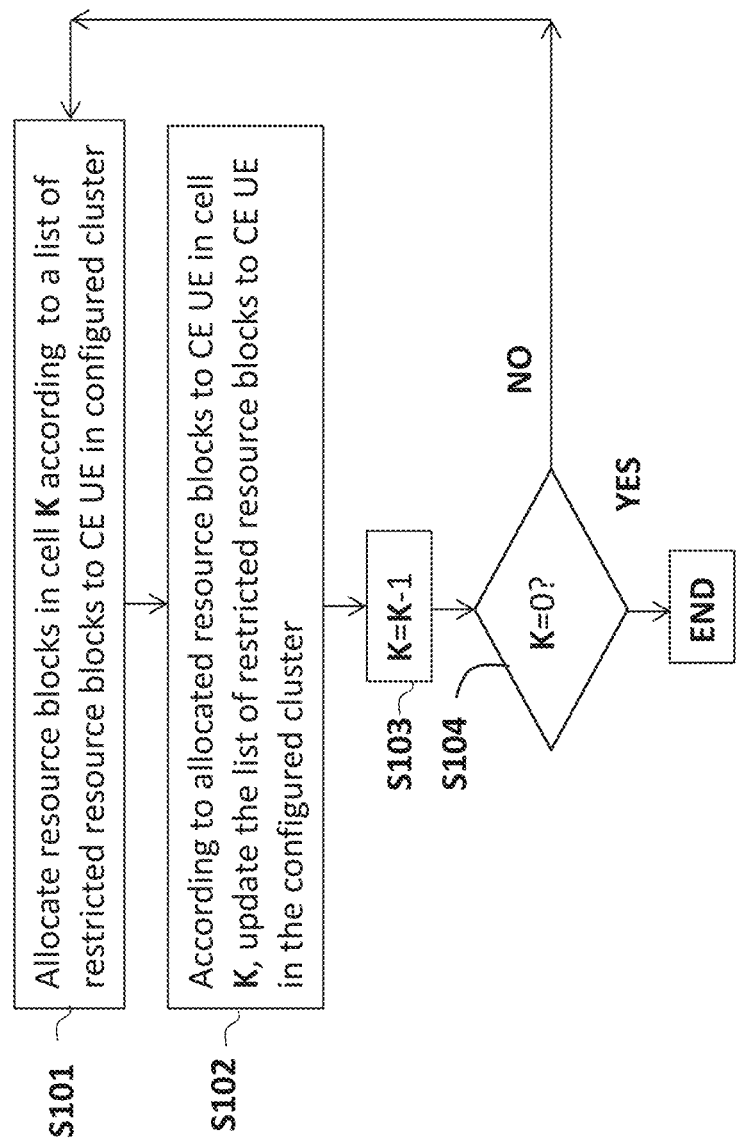
FIG. 10 is a flowchart illustrating partial procedures in the method of allocating radio resources in cluster by using dynamic ICI avoidance and radio resource restriction.

FIG. 10 is a flowchart illustrating partial procedures in the method of allocating radio resource in a cell cluster in accordance with the first exemplary embodiment. In particular, flowchart in FIG. 10 illustrates detailed procedures of the step S92 in FIG. 9. Additionally, all steps in FIG. 10 are applied to a single allocation period only, for example, a TTI.

In step S101 in FIG. 10, the cell coordination scheduler 527 or the BBU 541 of the base station server 10 allocates radio resource blocks in a cell with allocation priority rank K according to a list of restricted radio resource blocks to CE UE in the cluster. The list of restricted radio resource blocks is initially empty when the cell coordination scheduler 527 or the BBU 541 performs inter-cell radio resource allocation in a cell with the highest allocation priority.

In step S102, the cell coordination scheduler 527 or the BBU 541 updates the list of restricted radio resource blocks to CE UEs in the cell cluster according to allocated resource blocks to CE UEs in the cell with allocation priority K. The updated list of restricted radio resource blocks to CE UEs in the cell cluster will be applied to the intra-cell radio resource allocation of cell(s) with resource allocation priority rank lower than K.

In step S103, the cell coordination scheduler 527 or the BBU 541 decrements the value of K by one unit. Then, in step S104, the cell coordination scheduler 527 or the BBU 541 determines whether the value of K is equal to 0. When the value of K is equal to 0, then it is determined that all cells in the cluster have been allocated resource blocks for the present resource allocation period T. When the value of K is not equal to 0, then the cell coordination scheduler 527 or the BBU 541 repeats the previous two procedures/steps S101 and S102 for other cells having resource allocation priority lower than K in the cell cluster until all cells in the cluster are allocated with radio resource blocks for the present resource allocation period T.

Figure 11A:
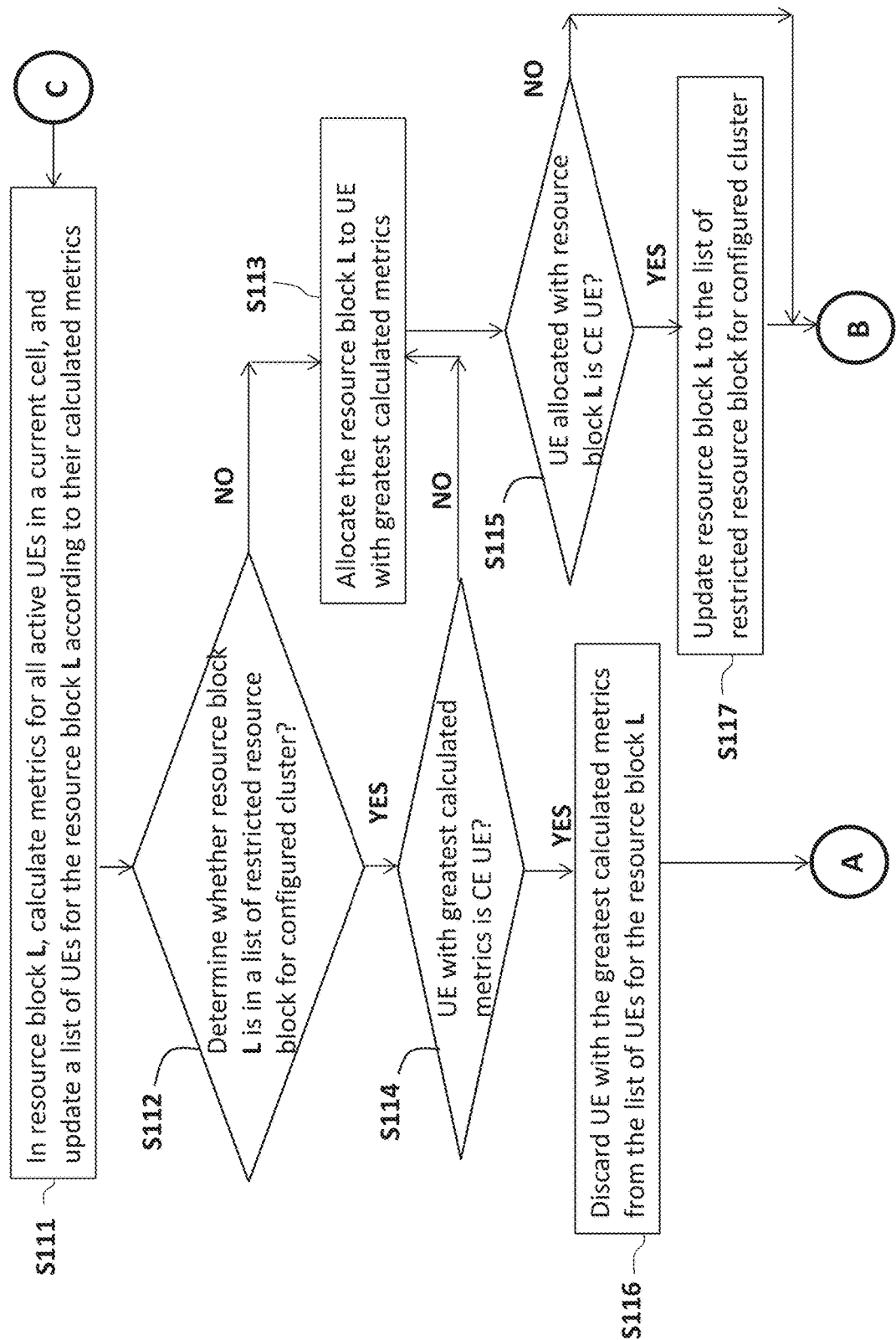
FIGS. 11A and 11B together depict a flowchart illustrating partial procedures in the method of allocating radio resource in a cluster by using dynamic ICI avoidance and radio resource restriction.
Figure 11B:
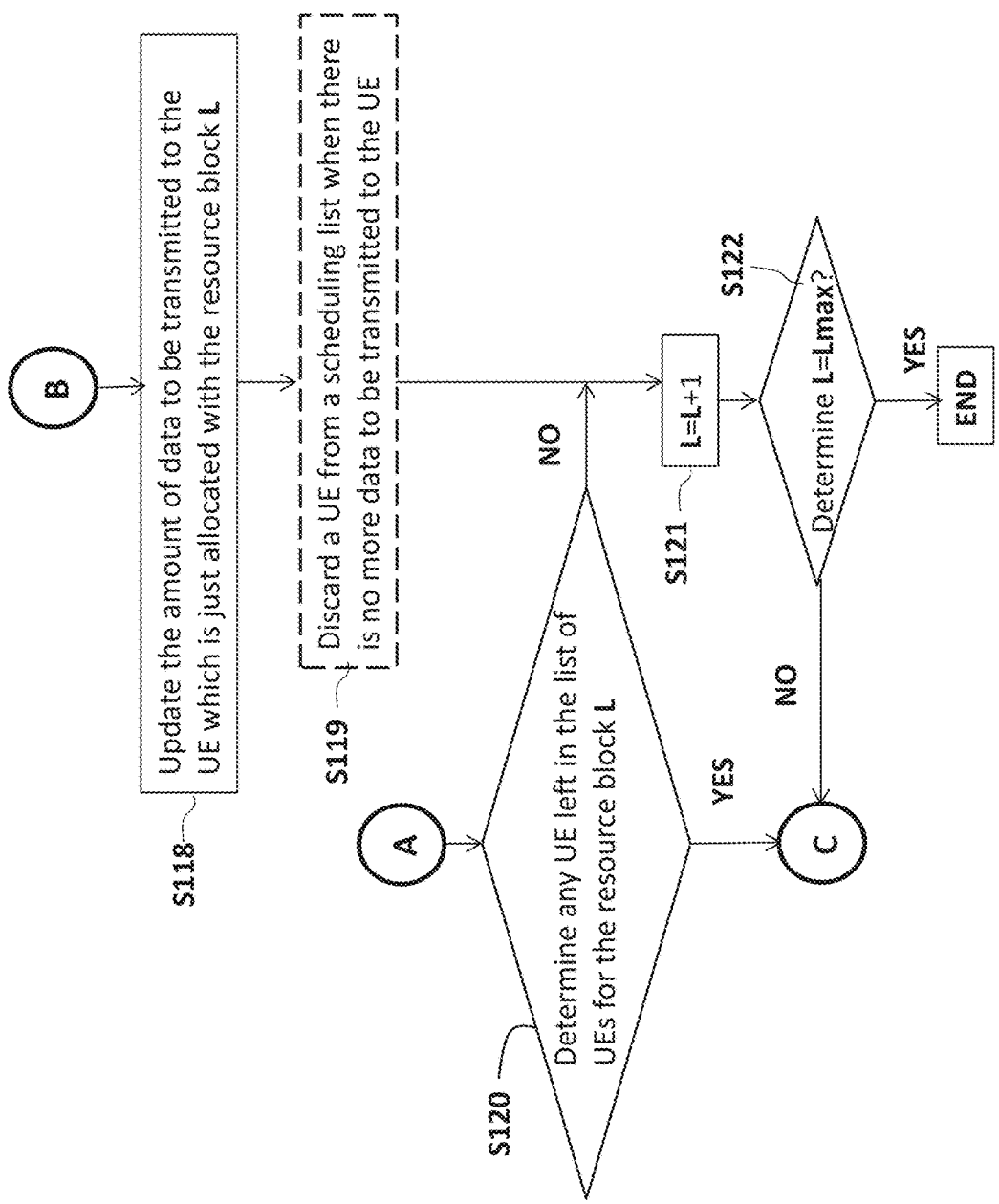

FIGS. 11A and 11B together depict a flowchart illustrating partial procedures in the method of allocating radio resource in a cluster by using dynamic ICI avoidance and radio resource restriction in accordance with the first exemplary embodiment. In particular, the steps shown in FIGS. 11A and 11B illustrate detailed procedures of the steps S101 and S102 shown in FIG. 10.

In step S111 of FIG. 10, the cell coordination scheduler 527 or the BBU 541 of the base station server 10 calculates metrics for all active UEs in a scheduling list in a current cell for a radio resource block L, and updates a list of UEs for the radio resource block L according to their calculated metrics.

In step S112, the cell coordination scheduler 527 or the BBU 541 determines whether the radio resource block L is in a list of restricted resource blocks for the cell cluster. When the present cell is the cell with the highest allocation priority, the list of restricted resource blocks is an empty set. When it is determined that the radio resource block L is a restricted resource block for the cell cluster, step S114 is executed after step S112. When it is determined that the radio resource block L is not the restricted resource block for the cell cluster, step S113 is executed after step S112.

In step S113, the cell coordination scheduler 527 or the BBU 541 determines to allocate the radio resource block L to the UE with greatest calculated metrics.

In step S114, the cell coordination scheduler 527 or the BBU 541 determines whether the UE with the greatest calculated metrics is a CE UE. When it is determined that the UE with the greatest calculated metrics is a CE UE, step S116 is executed after step S114. When it is determined that the UE with the greatest calculated metrics is a CC UE, step S115 is executed after the step S114. That is, when it is determined that the radio resource block L is not in the restricted resource block for the cell cluster, or the UE with the greatest calculated metrics is a CC UE, the cell coordination scheduler 527 or the BBU 541 determines to allocate the radio resource block L to the UE.

In step S115, the cell coordination scheduler 527 or the BBU 541 determines whether the UE just allocated with the radio resource block L is a CE UE. When it is determined that the UE just allocated with the radio resource block L is a CE UE, then step S117 is executed after the step S115; otherwise, step S118 is executed after step S115.

In step S116, the cell coordination scheduler 527 or the BBU 541 determines to discard the UE with the greatest calculated metrics from the list of UEs for the radio resource block L. Step S120 is executed after the step S116.

In step S117, the cell coordination scheduler 527 or the BBU 541 determines to update/add the radio resource block L to the list of restricted resource blocks for the cell cluster for the present allocation period T.

In step S118, the cell coordination scheduler 527 or the BBU 541 determines to update the amount of data to be transmitted to the UE which is just allocated with the radio resource block L. Since the radio resource block L is just allocated to the UE, the cell coordination scheduler 527 or the BBU 541 decreases the amount of data waiting to be transmitted to the UE by the amount of data which can be transmitted on the radio resource block L.

In step S119, the cell coordination scheduler 527 or the BBU 541 checks whether there is any UE with more data to be transmitted to the UE, and discards the UE from the scheduling list in the current cell when there is no more data to be transmitted to the UE. In step S119, when the cell coordination scheduler 527 or the BBU 541 determines a UE in the scheduling list in the current cell no longer needs to receive downlink data, the cell coordination scheduler 527 or the BBU 541 can discard the UE from the scheduling list of UEs of the current cell. The step S119 is an optional step.

In step S120, the cell coordination scheduler 527 or the BBU 541 determines whether any UE remains in the list of UEs for the radio resource block L. When it is determined that there is at least one UE left in the list of UEs for the radio resource block L, step S111 is executed after step S117. When it is determined that there are no more UEs left in the list of UEs for the radio resource block L, the step S121 is executed after step S120.

In step S121, the cell coordination scheduler 527 or the BBU 541 updates the value of L by incrementing the value of L by one unit. In step S122, the cell coordination scheduler 527 or the BBU 541 determines whether the updated value of L is equal to Lmax, which refers to the maximum number of radio resource blocks available for the current cell. When it is determined that the updated value of L is not equal to Lmax, it means that there is still at least one radio resource block in the present cell has not been considered in the intra-cell radio resource allocation. In this case, step S111 is executed after step S122. On the other hand, when it is determined that the updated value of L is equal to Lmax, then the intra-cell radio resource allocation in the present cell is completed. Then, the cell coordination scheduler 527 or the BBU 541 continues to perform an intra-cell radio resource allocation in the next cell of the cluster or a first cell in the cluster for the next allocation period T.

Figure 12:
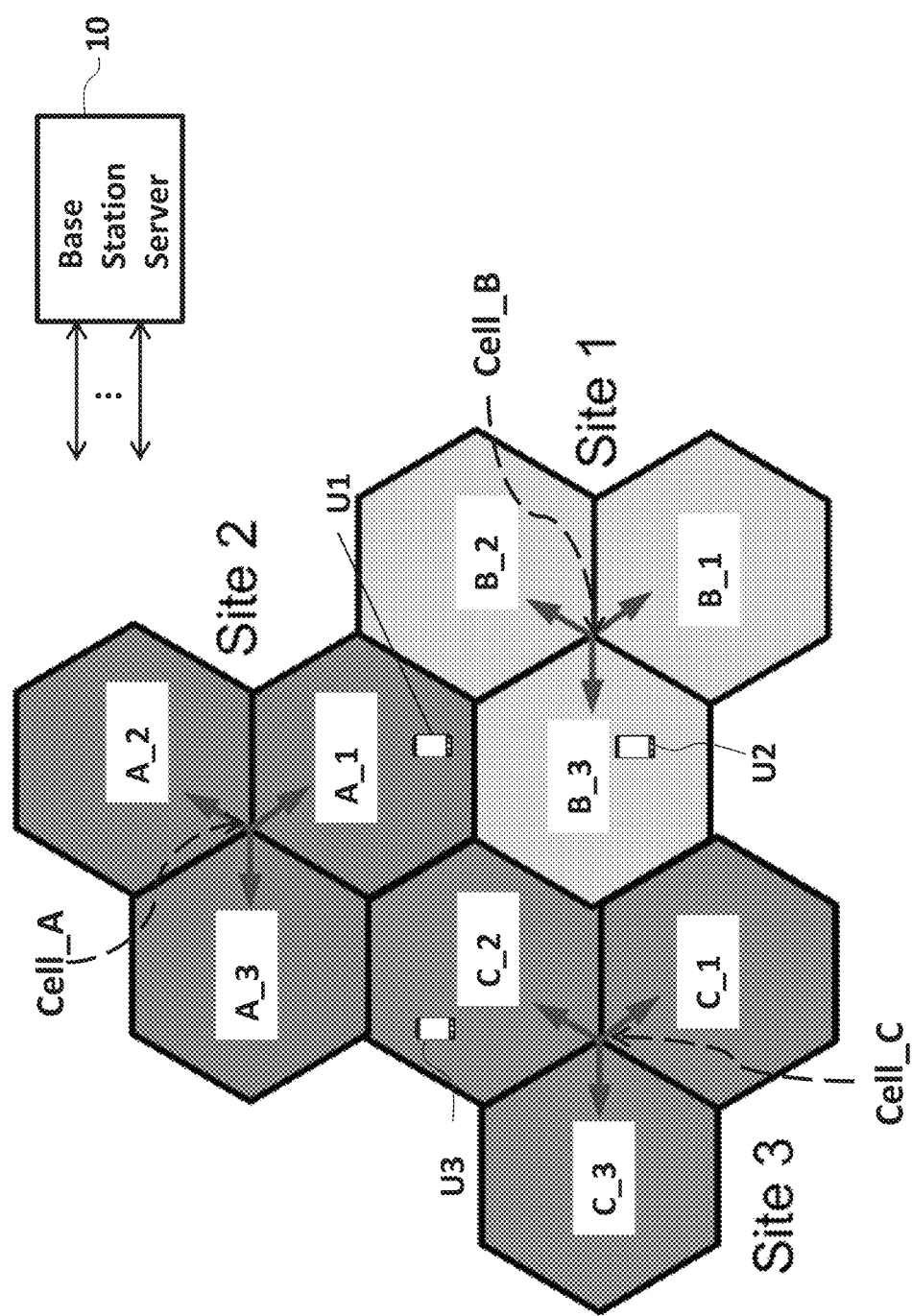
FIG. 12 is a schematic diagram illustrating a network layout for a 9-sector simulation of the method of allocating resource by using ICI avoidance with restricted radio resource strategy.

FIG. 12 is an exemplary schematic illustrating a network layout for a 9-sector simulation of the method in accordance with a second exemplary embodiment of the present disclosure. In FIG. 12, there are 3 cells labelled as Site 1, Site 2 and Site 3. The RHUs Cell_A, Cell_B and Cell_C are connected with the base station server 10, and each of RHUs Cell_A, Cell_B and Cell_C provides radio frequency coverage within its sectors. For example, the RHU Cell_A covers sectors A_1, A_2 and A_3; the RHU Cell_B covers sectors B_1, B_2 and B_3; the RHU Cell_C covers sectors C_1, C_2 and C_3. In this embodiment, it is proposed to assign allocation priorities to cells Cell_A, Cell_B and Cell_C. It is also proposed to assign allocation priorities to: (i) sectors A_1, A_2 and A_3 within the cell Cell_A, (ii) sectors B_1, B_2 and B_3 within the cell Cell_B, and (iii) sectors C_1, C_2 and C_3 within the cell Cell_C.

Figure 13:
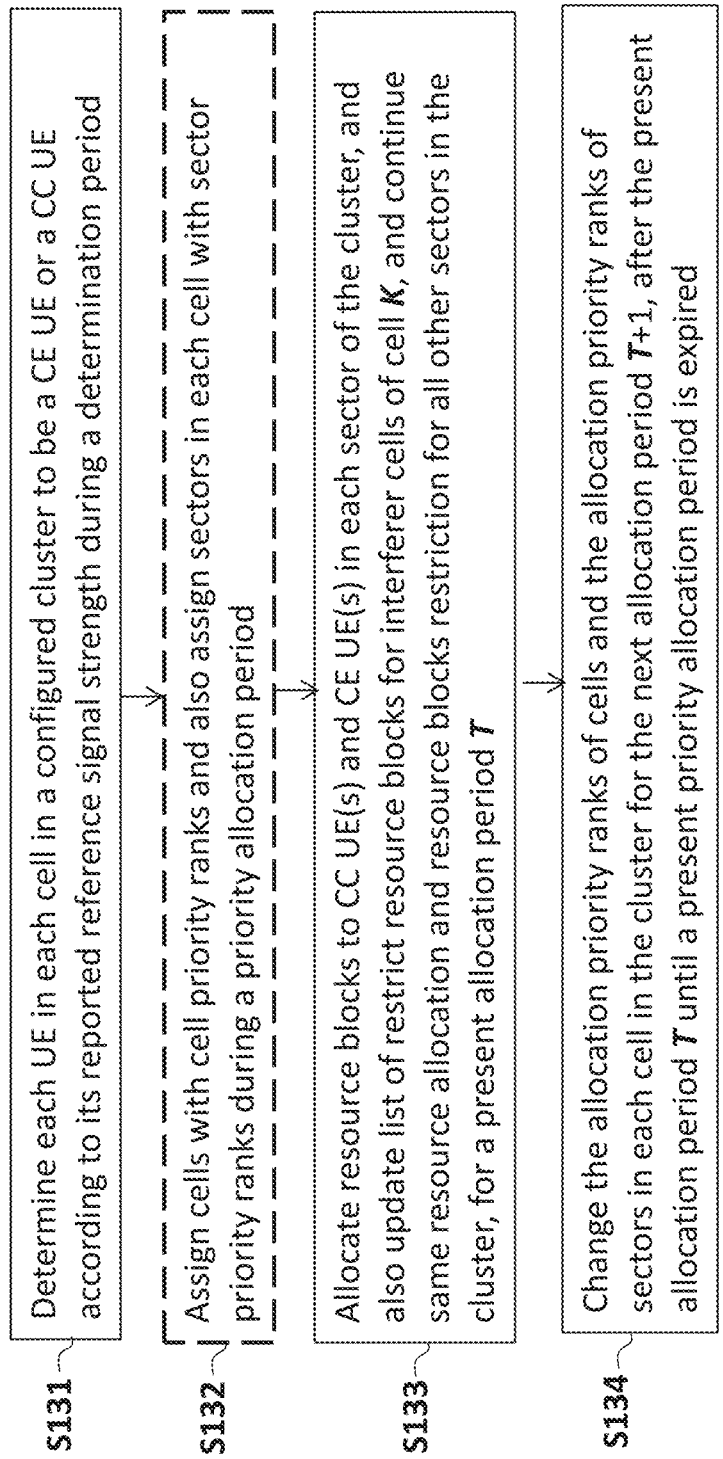
FIG. 13 is a flowchart illustrating the method of allocating radio resources in a cluster by using dynamic ICI avoidance and radio resource restriction.

FIG. 13 is a flowchart illustrating the method of allocating radio resource in cluster by using dynamic inter-cell interference avoidance and radio resource restriction in accordance with the second exemplary embodiment. The proposed method in the second exemplary embodiment can be applied to any cluster of P cells and Q sectors, where P is greater than or equal to 3 and Q is greater than or equal to 9. However, the detailed operations of the proposed method in the second exemplary embodiment will be explained below along with a configured 9-sector cluster shown in FIG. 12.

In step S131 of FIG. 13, the cell coordination scheduler 527 or the BBU 541 of the base station server 10 determines each UE in each cell in a cell cluster to be a CE UE or a CC UE according to its reported reference signal strength. The cell coordination scheduler 527 or the BBU 541 is connected to RHUs respectively at Cell_A, Cell_B, Cell_C. The configured cluster shown in FIG. 12 consists of 9 sectors respectively belong to Cell_A, Cell_B, Cell_C. The BBU 541 corresponds to RHUs at cells Cell_A, Cell_B, Cell_C. Additionally, the cell coordination scheduler 527 or the BBU 541 is responsible for intra-cell resource allocation in cells Cell_A. Cell_B. Cell_C. and also inter-cell resource allocation for the configured 9-sector cluster.

For example, when the pilot signal (or SINR) of a serving cell reported by a UE A is greater than pilot signal strengths (or SINR) of other cells by the threshold amount delta Δ (pre-configured by the mobile network operator or according to an algorithm), the cell coordination scheduler 527 of the base station server 3 may consider this UE A as a CC UE. On the other hand, when the pilot signal (or SINR) of a serving cell reported by a UE B is not greater than pilot signal strengths (or SINR) of other cells by the threshold amount delta Δ, the cell coordination scheduler 527 of the base station server 3 may consider this UE B as a CE UE. For another example, when another UE C respectively receive 2 or more pilot signals from 2 or more cells with nearly equal signal strength, the cell coordination scheduler 527 of the base station server 3 may consider this UE C as a CE UE.

In step S132, the coordination scheduler 527 or the BBU 541 assigns allocation priorities to Cell_A, Cell_Band Cell_C and also assigns resource allocation priorities to sectors in each cell during a priority allocation period G. For example, the resource priority allocation period G can be 50 TTI and the allocation period T can be 1 TTI. The cell priority ranks and sector priority ranks at priority allocation period G may be similar to those shown in Table I below. In the second exemplary embodiment, it is proposed to maintain two levels of allocation priority at a cell level and a cluster level. Then, it is efficient and organized for the coordination scheduler 527 or the BBU 541 to conduct intra-cell radio resource allocation for most sectors when neighbouring sector's UEs have been assigned with restricted radio resource. There is no restricted radio resource when the intra-cell radio resource allocation is conducted on the sector with the highest cell allocation priority in the cell with the highest sector allocation priority, for example, the sector A_1 in the cell Cell_A during the priority allocation period G.

TABLE I

Examples of allocation priority ranks

| Priority Allocation Period: G | | Priority Allocation Period: G + 1 | | Priority Allocation Period: G + 2 | |
|---|---|---|---|---|---|
| Cell priority ranks | Sector priority ranks | Cell priority ranks | Sector priority ranks | Cell priority ranks | Sector priority ranks |
| (1) Cell_A | (1) A_1 | (1) Cell_B | (1) B_2 | (1) Cell_C | (1) C_3 |
| | (2) A_2 | | (2) B_3 | | (2) C_1 |
| | (3) A_3 | | (3) B_1 | | (3) C_2 |
| (2) Cell_B | (1) B_1 | (2) Cell_C | (1) C_2 | (2) Cell_A | (1) A_3 |
| | (2) B_2 | | (2) C_3 | | (2) A_1 |
| | (3) B_3 | | (3) C_1 | | (3) A_2 |
| (3) Cell_C | (1) C_1 | (3) Cell_A | (1) A_2 | (3) Cell_B | (1) B_3 |
| | (2) C_2 | | (2) A_3 | | (2) B_1 |
| | (3) C_3 | | (3) A_1 | | (3) B_2 |

In step S133, the cell coordination scheduler 527 or the BBU 541 allocates radio resource blocks to CC UE(s) and CE UE(s) in each cell of the cluster, and also updates a list of/lists of restricted radio resource blocks for interfering sectors/cells of cell K. Then, the cell coordination scheduler 527 or the BBU 541 continues the same "radio resource blocks allocation and radio resource restriction" procedure for all other sectors and all other cells in the cluster. That means, a sector J with higher resource allocation priority rank will be allocated with radio resource block prior to the radio resource block allocation to a sector Q with lower allocation priority rank. Then, the radio resource block assigned to the CE UE in the sector J with higher resource allocation priority rank will be added into a list of restricted radio resource block for the sector Q, which is considered by the coordination scheduler 527 or the BBU 541 as an interfering sector of the sector J.

For example, the cell coordination scheduler 527 or the BBU 541 determines in advance that the cell allocation priority in the configured 9-sector cluster during the priority allocation period G is: Cell_A>Cell_B>Cell_C. Also, in this example, the sector allocation priority ranks in the cell Cell_A is: A_1>A_2>A_3. Then, the cell coordination scheduler 527 or the BBU 541 performs an intra-cell radio resource block allocation for sector A_1 of the cell Cell_A for the present allocation period T, and allocates a radio resource block L to a CE UE U1. The cell coordination scheduler 527 or the BBU 541 also determines that the sector B_3 of the cell Cell_B and the sector C_2 of the cell Cell_C are interfering sectors to the CE UE U1, and thus updates the radio resource block L in lists of restricted radio resource block respectively for the sector B_3 and the sector C_2. When the cell coordination scheduler 527 or the BBU 541 performs intra-cell radio resource allocation with radio resource restriction in the sector B_3 and the sector C_2, both a CE UE U_2 in the sector B_3 or a CE UE U_3 in the sector C_2 are restricted from being allocated the radio resource block L as it is recorded in the lists of restricted radio resource blocks respectively of the sector B_3 and the sector C_2. However any CC UE in the interfering sectors such as the sector C_2 and the sector B_3 is not blocked from being allocated the radio resource block L.

Similar procedures will be executed consecutively for all sectors in the cluster such that the "intra-cell radio resource allocation with restricted radio resource blocks" procedure is performed one sector after another until UEs in all sectors in the cluster have been allocated resources. For example, during the priority allocation period G, the cell coordination scheduler 527 or the BBU 541 firstly performs the "intra-cell radio resource allocation with radio resource blocks restriction" procedure in the cell Cell_A (which has the cell allocation priority of 1). The "intra-cell radio resource allocation with radio resource blocks restriction" procedures are performed consecutively on the sectors A_1, A_2 and A_3, which respectively have sector allocation priority rank of 1, 2 and 3 in the cell Cell_A. Then, the cell coordination scheduler 527 or the BBU 541 continues to perform the "intra-cell radio resource allocation with radio resource blocks restriction" procedure in the cell Cell_B and Cell_C consecutively, for the same priority allocation period G. Therefore, the sequence of performing "intra-cell radio resource allocation with radio resource blocks restriction" is: sector A_1→sector A_2→sector A_3->sector B_1→sector B_2→sector B_3→sector C_1→sector C_2→sector C_3.

Differences between the first exemplary embodiment and the second exemplary embodiment are: there is a global list of restricted radio resource blocks maintained in the cluster in the first exemplary embodiment; there will be a separate list of restricted radio resource blocks maintained for each sector in the second exemplary embodiment; only interfering sector will have its list of restricted radio resource blocks updated in the second exemplary embodiment.

In step S134, the coordination scheduler 527 or the BBU 541 changes the cell allocation priorities of cells and the sector allocation priorities of sectors in each cell in the cluster for the next resource allocation period T+1, after the present resource allocation period T, until the present priority allocation period G expires. The basic unit of the allocation period can be, for example, a TTI. The change of the allocation priority ranks of cells in the cluster can be, for example, (a) randomly selected; (b) selected by round-robin or (c) configured by another algorithm to improve the fairness of resource allocation to UEs in different cells of the configured cluster. The resource priority allocation period T can be, for example, 50 TTIs.

Figure 14:
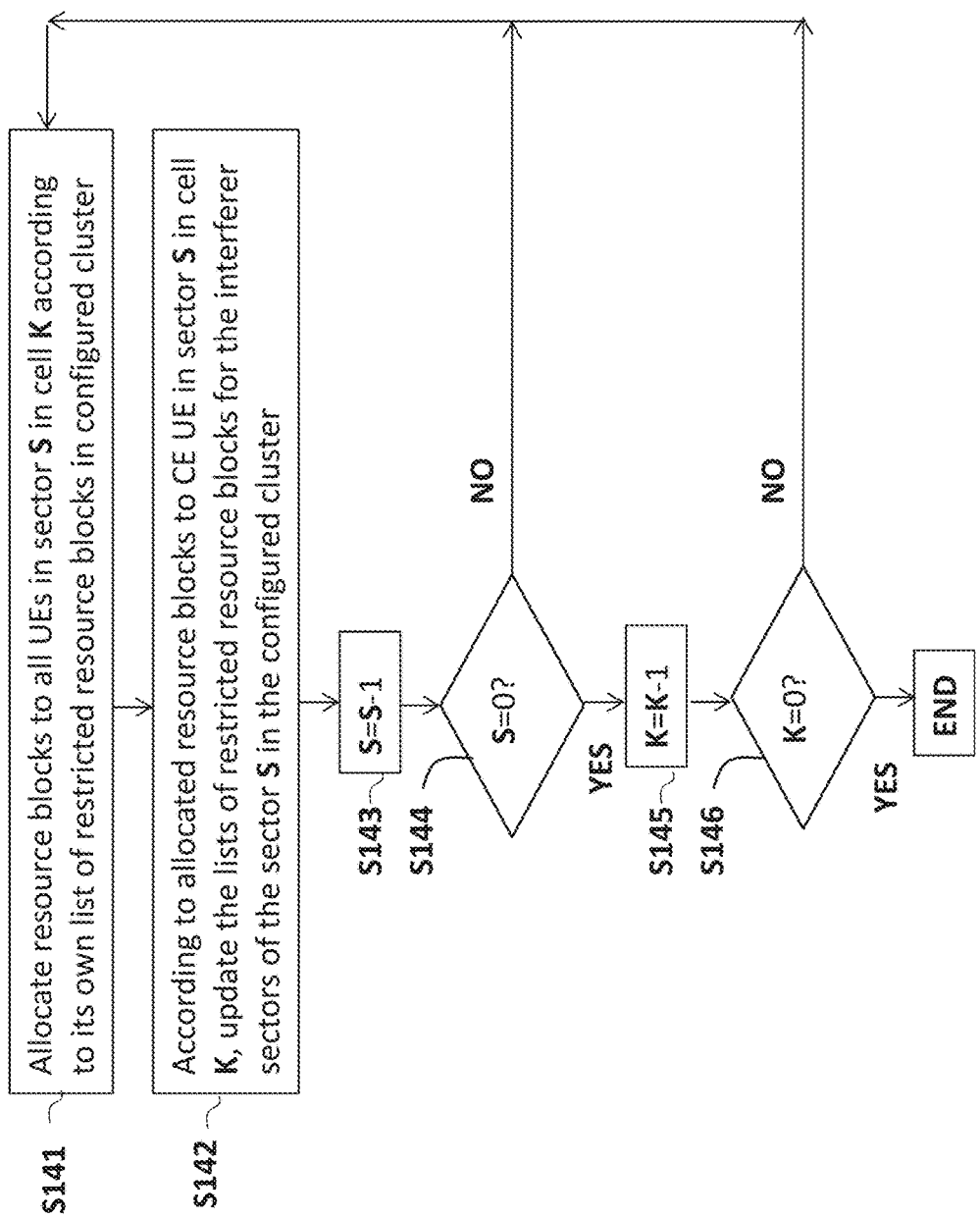
FIG. 14 is a flowchart illustrating partial procedures in the method of allocating radio resources in a cluster by using dynamic ICI avoidance and radio resource restriction.

FIG. 14 is a flowchart illustrating partial procedures in the method of allocating radio resource in cluster by using dynamic inter-cell interference avoidance and radio resource restriction in accordance with the second exemplary embodiment. In particular, flowchart in FIG. 14 illustrates detailed procedures of the step S133 in FIG. 9. Additionally, all steps in FIG. 14 are applied to a single allocation period, for example, a TTI.

In step S141 in FIG. 14, the cell coordination scheduler 527 or the BBU 541 of the base station server 10 allocates radio resource blocks in a sector with sector allocation priority S in a cell with cell allocation priority K according to the sector's own list of restricted radio resource blocks to CE UE in the configured cluster. The list of restricted radio resource blocks for each sector and each cell is initially empty when the cell coordination scheduler 527 or the BBU 541 starts allocating radio resource blocks to UEs in a cell with the highest allocation priority rank. If the cell allocated priority K has the highest priority then there is no list of restricted radio resource blocks for the sector with the highest sector allocation priority in cell K.

In step S142, the cell coordination scheduler 527 or the BBU 541 updates the lists of restricted radio resource blocks to CE UEs for the interferer sectors in the configured cluster according to allocated resource blocks to CE UEs in the sector with the sector allocation priority rank S in the cell with cell allocation priority rank K. Interferer sectors in the configured cluster cannot be the cells with allocation priority rank higher than K.

Steps S143 and S144 are inner loop determinations of sectors in FIG. 14. In step S143, the cell coordination scheduler 527 or the BBU 541 decrements the value of S by one unit. Then, in step S144, the cell coordination scheduler 527 or the BBU 541 determines whether the value of S is equal to 0. When the value of S is equal to 0, then it is determined that all sectors in the current cell with the cell allocation priority K have been allocated resources for the present allocation period T. When the value of S is not equal to 0, then the cell coordination scheduler 527 or the BBU 541 repeats the previous two procedures/steps S141 and S142 for other sectors with allocation priority lower than S in the present cell with the cell allocation priority rank K until all sectors in the present cell with the cell allocation priority K are allocated with radio resource blocks for the present allocation period T.

Steps S145 and S146 are outer loop determinations of cells in FIG. 14. In step S145, the cell coordination scheduler 527 or the BBU 541 decrements the value of K by one unit. Then, in step S146, the cell coordination scheduler 527 or the BBU 541 determines whether the value of K is equal to 0. When the value of K is equal to 0, then it is determined that all cells in the cluster have been allocated resources for the present allocation period T. When the value of K is not equal to 0, then the cell coordination scheduler 527 or the BBU 541 repeats the previous procedures/steps S141 to S144 for other cells with allocation priority less than K in the configured cluster until all cells in the cluster have been allocated with radio resource blocks for the present allocation period.

Figure 15A:
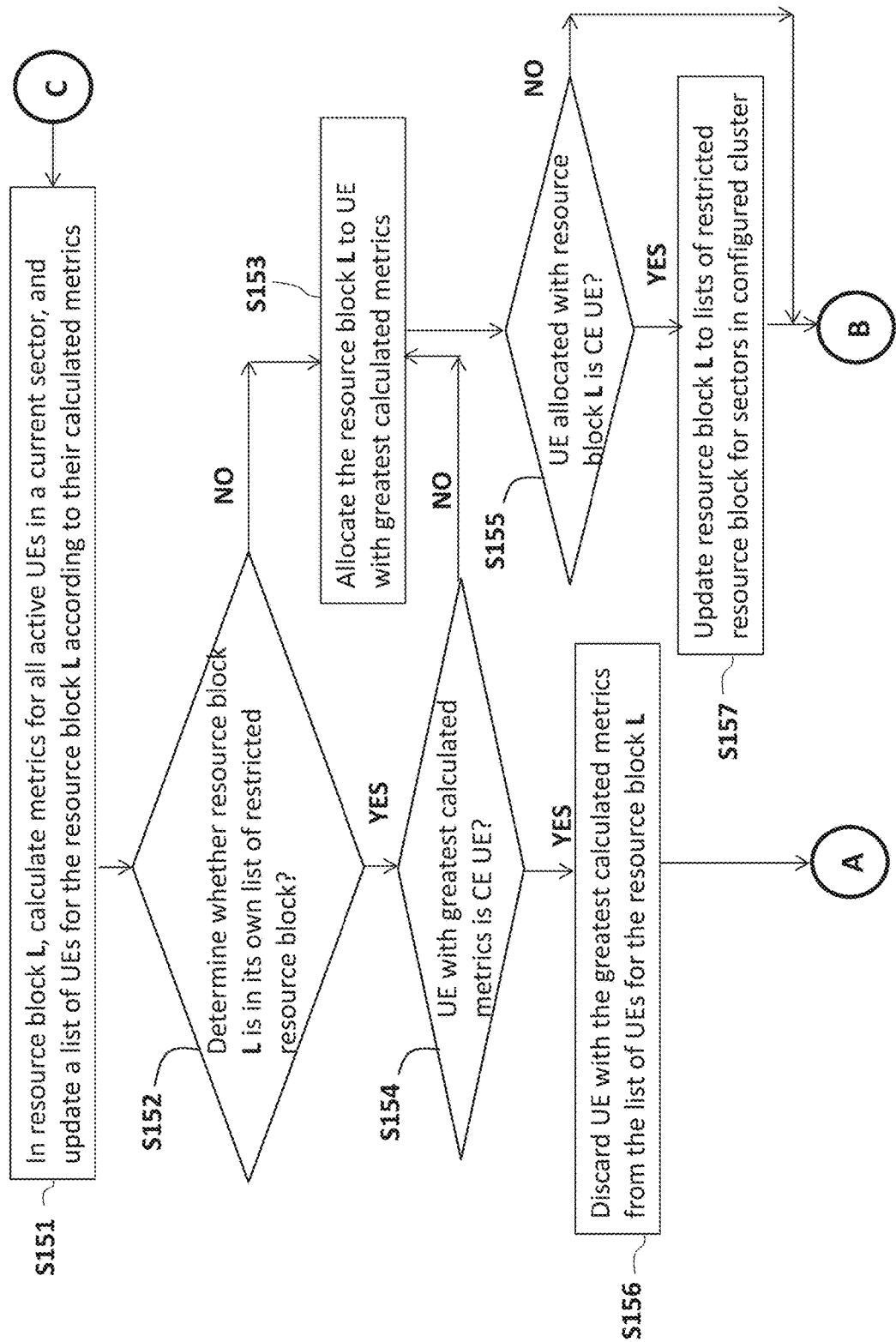
FIGS. 15A and 15B together depict a flowchart illustrating partial procedures in the method of allocating radio resource in a cluster by using dynamic ICI avoidance and radio resource restriction.
Figure 15B:
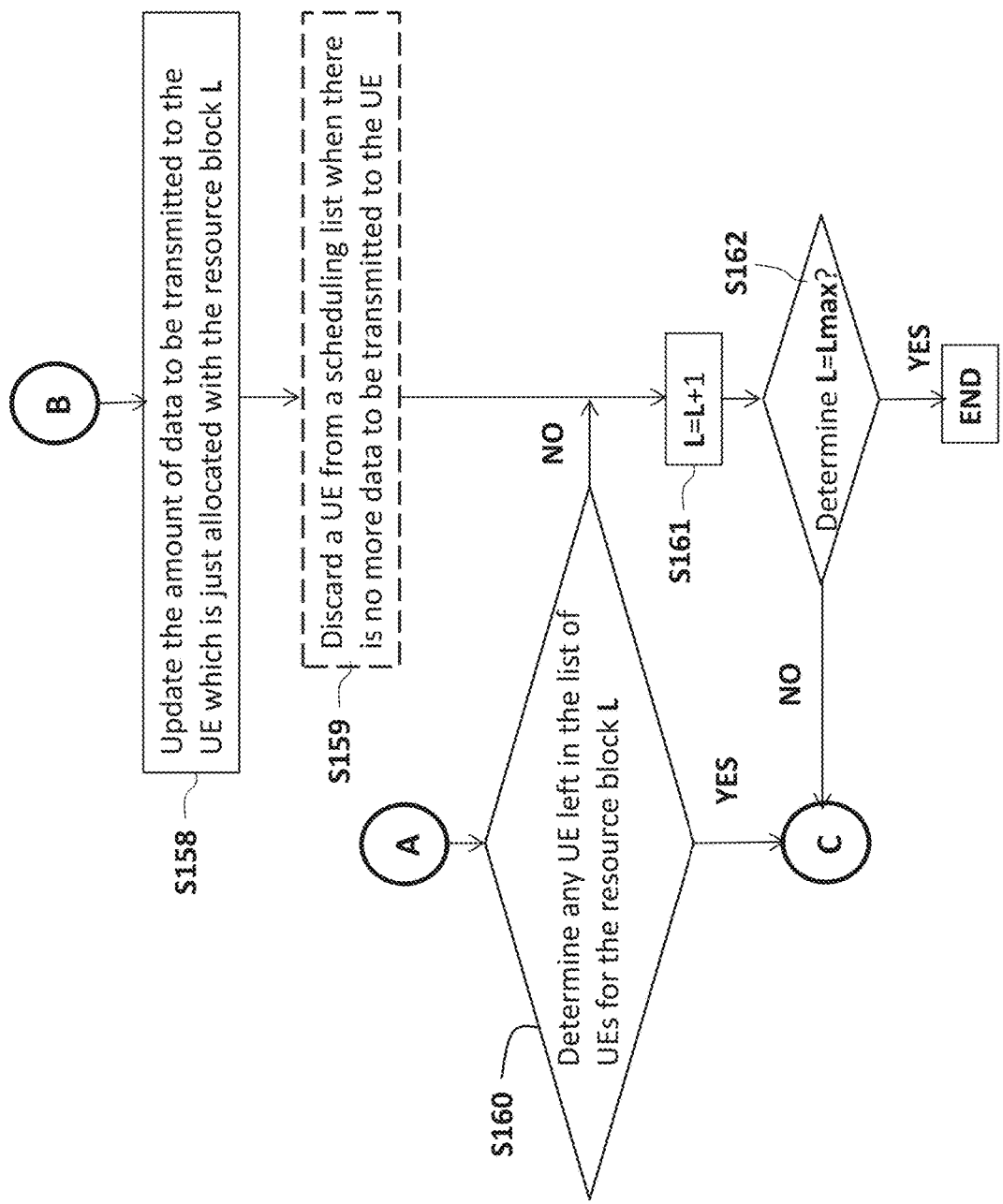

FIGS. 15A and 15B together depict a flowchart illustrating partial procedures in the method of allocating radio resource in cluster by using dynamic inter-cell interference avoidance and radio resource restriction in accordance with the second exemplary embodiment. In particular, the steps shown in FIGS. 15A and 15B illustrate detailed procedures of the steps S141 and S142 shown in FIG. 14.

In step S151 of FIG. 10, the cell coordination scheduler 527 or the BBU 541 of the base station server 10 calculates metrics for all active UEs in a scheduling list in a sector in a current cell for a radio resource block L, and updates a list of UEs for the radio resource block L according to their calculated metrics.

In step S152, the cell coordination scheduler 527 or the BBU 541 determines whether the radio resource block L is in the current sector's own list of restricted resource block for the cell cluster. When the current sector in the current cell under the "intra-cell radio resource allocation with radio resource blocks restriction" procedure is the sector with the highest sector allocation priority in a cell with highest cell allocation priority, the sector's own list of restricted resource block is an empty set. When it is determined that the radio resource block L is a restricted resource block for the current sector in the current cell, step S154 is executed after the step S152. When it is determined that the radio resource block L is not a restricted resource block for the current sector in the current cell, step S153 is executed after the step S152.

In step S153, the cell coordination scheduler 527 or the BBU 541 determines to allocate the radio resource block L to a UE with greatest metrics calculated in the step S151, in the list of UEs at the current sector.

In step S154, the cell coordination scheduler 527 or the BBU 541 determines whether the UE with the greatest calculated metrics is a CE UE. When it is determined that the UE with the greatest calculated metrics is a CE UE, step S156 is executed after the step S154. When it is determined that the UE with the greatest calculated metrics is a CC UE, step S153 is executed after the step S154. That is, when it is determined that the radio resource block L is not in the restricted resource block for the configured cluster, or the UE with the greatest calculated metrics is a CC UE, the cell coordination scheduler 527 or the BBU 541 determines to allocate the radio resource block L to the UE.

In step S155, the cell coordination scheduler 527 or the BBU 541 determines whether the UE which has just been allocated with the radio resource block L is a CE UE. When it is determined that the UE just allocated with the radio resource block L is a CE UE, then step S157 is executed after the step S155; otherwise, step S158 is executed after the step S155.

In step S156, the cell coordination scheduler 527 or the BBU 541 determines to discard the UE with the greatest calculated metrics from the list of UEs for the radio resource block L. Step S160 is executed after the step S156.

In step S157, the cell coordination scheduler 527 or the BBU 541 determines to update the radio resource block L to a list of/lists of restricted resource block for interferer sectors in the configured cluster for the present allocation period. The method for determining which sector is an interferer sector for the current sector depends upon the reported reference signal strengths of the current cell and the neighbouring cell of a CE UE in the current cell. For example, the reported reference signal strength refers to pilot signal strength or reference signal strength detected by each UE. When the reference signal strength (or SINR) of a serving cell reported by a CE UE C is not greater than pilot signal strengths (or SINR) of a neighbouring cell by a threshold amount sigma σ (which can be set by the mobile network operator or according to an algorithm), the coordination scheduler 527 or the BBU 541 of the base station server 10 determines a sector, closest to the current sector, in the neighbouring cell as an interferer sector for the CE UE C. The configured threshold amount sigma σ may be 1 dB, 5 dB or 10 dB for example. Additionally, in the step S156, when the CE UE C is allocated with the radio resource block L, the radio resource block L is added by the cell coordination scheduler 527 or the BBU 541 into the interferer sector's own list of restricted radio resource blocks.

In step S158, the cell coordination scheduler 527 or the BBU 541 determines to update the amount of data to be transmitted to the UE which is just allocated with the radio resource block L. Since the radio resource block L is just allocated to the UE, the cell coordination scheduler 527 or the BBU 541 decreases the amount of data waiting to be transmitted to the UE by the amount of data which can be transmitted on the radio resource block L.

In step S159, the cell coordination scheduler 527 or the BBU 541 checks whether there is any UE with more data to be transmitted to the UE, and discards the UE from the scheduling list in the current sector when there is no more data to be transmitted to the UE. In the step S159, when the cell coordination scheduler 527 or the BBU 541 determines a UE in the scheduling list in the current sector no longer needs to receive downlink data, the cell coordination scheduler 527 or the BBU 541 can discard the UE from the scheduling list of UEs of the current sector. The step S159 is an optional step.

In step S160, the cell coordination scheduler 527 or the BBU 541 determines whether any UE left in the scheduling list of UEs for the radio resource block L. When it is determined that there is at least one UE left in the scheduling list of UEs for the radio resource block L, the step S151 is executed after the step S160. When it is determined that there is no more UE left in the scheduling list of UEs for the radio resource block L, the step S161 is executed after the step S160.

In step S161, the cell coordination scheduler 527 or the BBU 541 updates the value of L by incrementing the value of L by one unit. In step S162, the cell coordination scheduler 527 or the BBU 541 determines whether the updated value of L is equal to Lmax, which refers to the maximum number of radio resource blocks configured for the current sector. When it is determined that the updated value of L is not equal to Lmax there is still at least one radio resource block, in the current sector, which has not been allocated resources; then, step S161 is executed after the step S162. On the other hand, when it is determined that the updated value of L is equal to Lmax, the intra-cell radio resource allocation in the current sector is completed. The cell coordination scheduler 527 or the BBU 541 continues to perform an intra-cell radio resource allocation in the next sector or a first cell in the cluster for the next allocation period.

In a large scale implementation, when the number of cells controlled by the base station server 10 is large, the number of cells can be divided into several clusters as needed for ICI coordination. When there are multiple clusters in the wireless communication system, each cluster can share information with other clusters to avoid ICI. The concept of the solution for multi-cluster ICI coordination can be explained below.

Apart from the base station server 10 maintaining a "list of restricted radio resource blocks" for each sector or each cell or the cluster, the cell coordination scheduler 527 of the base station server 10 can also maintain a "list of neighbouring and interfering cells" for each cell or each sector in the cluster. Also, the cell coordination scheduler 527 can maintain a "list of neighbouring cells of nearby clusters" for each cluster in the wireless communication system. For example, in a Cluster A, Cell 3 and 4 are neighbors of Cluster B; Cells 4, 5, 6 are neighbors with Cluster C. After the proposed method of allocating radio resource with restricted radio resource blocks is performed according to the steps of the first or the second exemplary embodiment, the information about radio resource blocks allocated to CE UEs for Cell 3 and 4 will be transmitted to the cluster scheduler/cell coordination scheduler 527 responsible for radio resource allocation in Cluster B.

According to the cluster priority (or the cell priority), a cluster with lower cluster allocation priority will compare its radio resource block allocations with cells of the neighboring cluster. When there is a conflict on radio resource block allocation the cell coordination scheduler 527 can determine that the cluster with lower priority withdraws the allocation of the conflicted CE radio resource blocks. For example, Cluster A has higher cluster allocation priority than Cluster B. When the Cluster B has Cells 6 and 7 neighboring with Cluster A, and if a same radio resource block was assigned in these two cells, the radio resource block allocation of the CE UE in the Cluster B will be withheld. As a result, the interference around the border of clusters is avoided.

FIG. 8 illustrates the network layout of a 3-sector simulation of the method of the present disclosure. The basic simulation parameters are shown below in Table II. Apart from the basic simulation parameters, there are other assumption in the simulations such as: each UE reports its channel quality indicator (CQI) feedback for each RB in each TTI, no delay in CQI report, UEs will be categorized into groups of CE users and CC users in each TTI (since location of UEs may be dynamically changed, categorization of UEs per TTI may be reasonable). Additionally, the total cluster throughput is defined as the total amount of bits successfully received by all UEs in the cluster, and the average throughput of CE UEs is defined as the $5^{th}$ percentile in the UE throughput distribution of each cell in the cluster.

TABLE II

Simulation Parameters for 3-Sector Network Layout

| Parameter | Value |
| --- | --- |
| Number of sectors | 3 (Three sector cluster) |
| Cell radius | 500 m |
| Bandwidth | 10 MHz |
| Tx power | 46 dBm |
| Transmission mode | SISO |
| Frame Structure | FDD |
| HARQ | OFF |
| Number of UEs per Cell | 100 |

TABLE II-continued

Simulation Parameters for 3-Sector Network Layout

| Parameter | Value |
| --- | --- |
| UE Mobility model | Random Direction TSC |
| UE speed | 3 km/h |
| Handover | OFF |
| Application | Video 128 Kbps |
| Max Delay (QoS parameter for VIDEO) | 0.3 s |
| Scheduler | MLWDF |
| Simulation duration | 100 s |

Table III illustrates the performance gain obtained using centralised resource allocation based on C-RAN in the 3-sector cluster and the resource restriction strategy explained in the first exemplary embodiment above. The simulation environment consists of three cells with base stations at respective sites and the 3-sector refers to the region where 3 sectors from Cell 1, Cell 2 and Cell 3 are neighbouring/next to each other respectively (See FIG. 8). The parameter $\alpha$ in Table III refers to the pre-configured threshold amount delta $\Delta$ between CC users and CE users. The simulation clearly demonstrates CE UE throughput improvement from C-RAN or centralized allocation of CE RBs to CE UEs in the cluster. The simulation indicates that as $\Delta$ increases (the CE region in each cell is also increased), CE UE throughput improvement and total throughput improvement are obtained as compared to when C-RAN is not utilised. Since this simulation only involves a 3-sector cluster, different numbers of UEs, such as 20 UEs, 60 UEs and 100 UEs are simulated in the pre-configured environment and the corresponding test results are shown in Table III.

TABLE III

Simulation Results for 3-Sector Network Layout

| | | Cell1 CE UE Throughput (Bytes) | Cell2 CE UE Throughput (Bytes) | Cell3 CE UE Throughput (Bytes) | CE UE Throughput Improvement Without C-RAN | Total Cluster Throughput (Bytes) | Total Throughput Improvement Without C-RAN |
| --- | --- | --- | --- | --- | --- | --- | --- |
| No C-RAN | UEs: 20 | 1964951.8 | 1982883.1 | 1882255 | — | 153067081.1 | — |
| | UEs: 60 | 2570423.1 | 2492711.7 | 2567480 | — | 54683641.1 | — |
| | UEs: 100 | 2930112.8 | 2872566.2 | 2978795.2 | — | 984691591.2 | — |
| SINR Threshold, $\alpha = 1$ | UEs: 20 | 2413951.8 | 2274975.8 | 2103897.8 | 16.45% | 173408743 | 13.29% |
| | UEs: 60 | 2597672.4 | 2499443.2 | 2586166 | 0.69% | 547475879.6 | 0.12% |
| | UEs: 100 | 2930112.8 | 2855051.4 | 2919497 | −0.83% | 974317075.2 | −1% |
| SINR Threshold, $\alpha = 5$ | UEs: 20 | 2481258.4 | 2414915.2 | 2325500.4 | 23.87% | 176967921.6 | 15.61% |
| | UEs: 60 | 2684439.4 | 2526307.2 | 2170890.2 | −3.22% | 524979499.8 | −4% |
| | UEs: 100 | 2963757.2 | 2653075 | 2192852.4 | −10% | 930134012.8 | −5% |
| SINR Threshold, | UEs: 20 | 2719040.6 | 2623939 | 2579121.6 | 35.91% | 183345843.2 | 19.78% |

TABLE III-continued

Simulation Results for 3-Sector Network Layout

|  |  | Cell1 CE UE Throughput (Bytes) | Cell2 CE UE Throughput (Bytes) | Cell3 CE UE Throughput (Bytes) | CE UE Throughput Improvement Without C-RAN | Total Cluster Throughput (Bytes) | Total Throughput Improvement Without C-RAN |
|---|---|---|---|---|---|---|---|
| $\alpha = 10$ | UEs: 60 | 2616471.6 | 2496755.2 | 1548300.4 | −12% | 500633223.4 | −8% |
|  | UEs: 100 | 2717461 | 1592949.8 | 710667.4 | −42% | 830226038.8 | −15% |

FIG. 12 illustrates the network layout of a 9-sector simulation of the method of the present disclosure. The basic simulation parameters are similar to those shown in Table II except that there are 9 sectors in the configured cluster of 3 cells at cell sites 1, 2 and 3 respectively. Apart from the basic simulation parameters, there are other assumptions in the simulations such as: each UE reports its channel quality indicator (CQI) feedback for each RB in each TTI, no delay in CQI report, UEs will be categorized into groups of CE users and CC users in each TTI (since location of UEs may be dynamically changed, categorization of UEs per TTI may be reasonable), and no inter-cluster interference. Additionally, the total cluster throughput is defined as the total amount of bits successfully received by all UEs in the cluster, and the average throughput of CE UEs is defined as the $5^{th}$ percentile in the UE throughput distribution of each cell in the cluster.

Table IV illustrates the performance gain obtained using centralised resource allocation based on C-RAN in the 9-sector cluster (in the cluster of three cells) and the resource restriction strategy explained in the first exemplary embodiment above. The simulation environment consists of 3 cells with base stations at respective sites and the 9-sector refers to the region with a total of 9 neighbouring sectors respectively from Cells 1, 2 and 3. The parameter α in Table IV refers to the pre-configured threshold amount delta Δ between CC users and CE users. The simulation clearly demonstrates CE UE throughput improvement from C-RAN or centralized allocation of CE RBs to CE UEs in the cluster. The simulation indicates that as Δ increases (the CE region in each cell is also increased), CE UE throughput improvement and total throughput improvement are obtained as compared to when C-RAN is not utilised. The simulation of 9-sector in the configured cluster is performed only with a number of 20 UEs in the pre-configured environment and the corresponding test results are shown in Table IV.

TABLE IV

Simulation Results for 9-Sector Network Layout

|  |  | Cell1 CE UE Throughput (Bytes) (Per Sector) | Cell2 CE UE Throughput (Bytes) (Per Sector) | Cell3 CE UE Throughput (Bytes) (Per Sector) | CE UE Throughput Improvement Without C-RAN (Per Sector) | Total Cluster Throughput (Bytes) | Total Throughput Improvement Without C-RAN |
|---|---|---|---|---|---|---|---|
| No C-RAN | UEs: 20 | 2749602.4 | 2145327.2 | 2725208.6 | — | 556940806.2 | — |
| SINR Threshold, $\alpha = 1$ | UEs: 20 | 2763936.2 | 2617839.2 | 2827112.6 | 0.14% | 557719822.8 | 0.14% |
| SINR Threshold, $\alpha = 5$ | UEs: 20 | 2830561 | 2670277.6 | 2827112.6 | 1.02% | 562646220.4 | 1.02% |
| SINR Threshold, $\alpha = 10$ | UEs: 20 | 3032606 | 3103395.2 | 3062910 | 2.74% | 572217498.6 | 2.74% |

By executing the methods for packet scheduling/resource allocation shown in preceding first and second exemplary embodiments for the C-RAN of the LTE network, the inter-cell interference in each cluster may be reduced drastically compared to the one without application of C-RAN or the proposed packet scheduling/resource allocation with ICI avoidance with radio resource blocks restriction in the LTE network.

The preceding exemplary embodiments of the present disclosure may be implemented in software/instruction codes/application logic/instruction set/computer program codes (executed by one or more processors), may be fully implemented in hardware, or implemented in combinations of software and hardware. For instance, the software (e.g., application logic, an instruction set) is maintained on any one of various conventional computer-readable media. In the present disclosure, a "computer-readable medium" may be any storage media or means that can carry, store, communicate, propagate or transport the instructions for use by, or in connection with, an instruction execution system, apparatus, or device, such as a communication device, a virtual cloud platform apparatus 5 shown in FIG. 5. A computer-readable medium may include a computer-readable storage medium (e.g., a physical device) that may be any media or means that can carry or store the instructions for use by or in connection with a system, apparatus, or device, such as a computer or a communication device. For instance, the memory unit 32 may include the computer-readable medium which may include computer program code which, when executed by the processor unit 31, may cause the cluster-level scheduler and the cell-level schedulers of BBUs in the virtual cloud platform apparatus 5 to perform procedures/steps illustrated in FIGS. 6, 7, 9, 10, 11A, 11B, 12, 13, 14, 15A and 15B.

Figure 16:
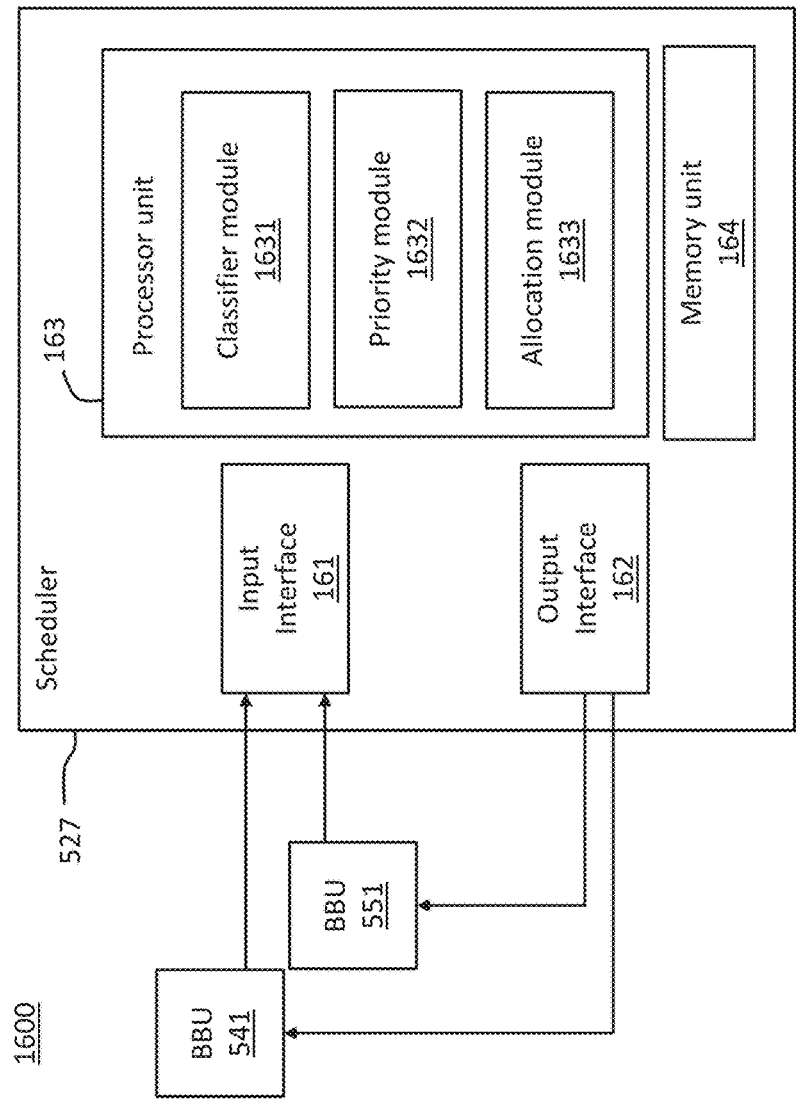
FIG. 16 is a schematic diagram of an exemplary system 1600 for implementing the method of allocating radio resource in a cluster by using dynamic ICI avoidance and radio resource restriction.

FIG. 16 is a schematic diagram of an exemplary system 1600 for implementing the method. The system 1600 comprises a scheduler 527 which comprises a processor unit 163, a memory unit 164 and input/output interfaces 161 and 162. BBUs 541 and 551 are connected to the input/output interfaces 161 and 162. The processor unit 163 comprises a classifier module 1631, a priority module 1632 and an allocation module 1633, each of which are configured to perform their respective functions. For example, the classifier module 1631 is configured to classify users in each of adjacent cells in a cellular communication network into cell edge users and cell centre users; the priority module 1632 is configured to determine allocation priorities for each of the adjacent cells; and allocation module 1633 is configured to allocate resources to the users in each of the adjacent cells based on the allocation priorities, except that resources allocated to cell edge users in one of the adjacent cells are restricted from use by other adjacent cells having lower allocation priorities.

Embodiments of the present disclosure provide highly effective and practical solutions to the problem of ICI in cellular communication networks, such as C-RAN, by allocating resources to users in adjacent cells of a cell cluster utilising a resource restriction strategy based on allocation priorities assigned to each cell.

The reference in this specification to any prior publication (or information derived from it), or to any matter which is known, is not, and should not be taken as an acknowledgement or admission or any form of suggestion that that prior publication (or information derived from it) or known matter forms part of the common general knowledge in the field of endeavour to which this specification relates.

It will be appreciated by those skilled in the art that numerous variations and/or modifications may be made to the invention without departing from the spirit or scope of the invention as broadly described. The present embodiments are therefore to be considered in all respects as illustrative and not restrictive.

The invention claimed is:

1. A method, comprising:
classifying users in each of adjacent cells in a cellular communication network into cell edge users and cell centre users;
determining allocation priorities for each of the adjacent cells;
allocating resources to the users in each of the adjacent cells based on the allocation priorities,
wherein the resources allocated to cell edge users in one of the adjacent cells are restricted from use by cell edge users of other adjacent cells having lower allocation priorities to thereby inhibit inter-cell interference among the adjacent cells, and
wherein the resources allocated to the cell edge users in one of the adjacent cells are capable of being used by cell centre users of one or more of the adjacent cells.

2. The method of claim 1, wherein the method is performed iteratively, and wherein the determining allocation priorities for each of the adjacent cells is changed at each iteration.

3. The method of claim 1, wherein the use by the other adjacent cells is use by cell edge users in the other adjacent cells.

4. The method of claim 1, wherein the determining allocation priorities is based on one of a random selection among the adjacent cells, a round-robin selection among the adjacent cells, and a fairness algorithm to determine a fair allocation among the adjacent cells.

5. The method of claim 1, wherein the classifying users is based on signal-to-interference-noise-ratio (SINR) of the cells, wherein at least one user within a cell having a SINR value greater than SINR values of other cells by a predefined threshold is classified as a cell centre (CC) user, whereas at least one user within a cell having a SINR value less than SINR values of other cells by a predefined threshold is classified as a cell edge (CE) user.

6. The method of claim 1, wherein the allocating resources is based on a packet scheduling algorithm.

7. The method of claim 1, wherein the method is performed by a base station server coupled to base station clients at each of the adjacent cells.

8. The method of claim 1, wherein each of the users comprises a user equipment, and wherein the adjacent cells form a cell cluster.

9. The method of claim 7, wherein the cellular communication network comprises a cloud radio access network.

10. An apparatus, comprising:
a processor;
a memory coupled to the processor; and
instructions stored in the memory that, when executed by the processor, cause the processor to: classify users in each of adjacent cells in a cellular communication network into cell-edge users and cell-centre users; determine allocation priorities for each of the adjacent cells; allocate resources to the users in each of the adjacent cells based on the allocation priorities,
wherein the resources allocated to cell-edge users in one of the adjacent cells are restricted from use by cell edge users of other adjacent cells having lower allocation priorities to thereby inhibit inter-cell interference among the adjacent cell, and
wherein the resources allocated to the cell edge users in one of the adjacent cells are capable of being used by cell centre users of one or more of the adjacent cells.

11. The apparatus of claim 10, wherein the cellular communication network comprises a cloud radio access network comprising a base station server coupled to base station clients at each of the adjacent cells.

12. The apparatus of claim 11, wherein the apparatus is the base station server.

13. The apparatus of claim 11, wherein the use by other adjacent cells is use by cell edge users in other adjacent cells.

14. An apparatus, comprising:
a classifier module configured to classify users in each of adjacent cells in a cellular communication network into cell edge users and cell centre users;
a priority module configured to determine allocation priorities for each of the adjacent cells; and
an allocation module configured to allocate resources to the users in each of the adjacent cells based on the allocation priorities,
wherein the resources allocated to cell edge users in one of the adjacent cells are restricted from use by cell edge users of other adjacent cells having lower allocation priorities to thereby inhibit inter-cell interference among the adjacent cells, and wherein the resources allocated to the cell edge users in one of the adjacent cells are capable of being used by cell centre users of one or more of the adjacent cells.

15. The apparatus of claim 14, wherein the apparatus is the base station server.

16. The method of claim 6, wherein the resources are allocated based upon one or more parameters selected from a group comprising a resource block, a priority of a user on the radio resource at a time 't', instantaneous data rate of user on the radio at the time 't', an average throughput of the user at the time 't', a time constant, total data rate being used to transmit packets to the user at time 't+1', an event indicative of the packets of the user being selected for transmission on the resource block at time 't+1', a maximum number of resource blocks available for cell centre (CC) users and a maximum number of resource blocks available for cell edge (CE) users.

17. The method of claim 6, wherein the resources are allocated based upon one or more parameters selected from a group comprising an Head of Line (HOL) packet delay of a user at time 't', a delay threshold of a user before the first HOL packet of the user is transmitted in downlink, maximum probability for the HOL packet delay of user to exceed the delay threshold of a user, a number of cell centre users (CCs) on which packet can be transmitted to the user in downlink, an instantaneous achievable data rate of the user on a component carrier at a resource block and a total average data rate of the user in all CCs.

* * * * *